May 10, 1966 L. B. WILKINS 3,250,192
MONITORING DEVICE FOR AN ELECTRONIC PHOTOGRAPHIC MACHINE
Filed April 17, 1963 10 Sheets-Sheet 3

INVENTOR.
LLOYD B. WILKINS
BY
*Woodhams, Blanchard and Flynn*
ATTORNEYS

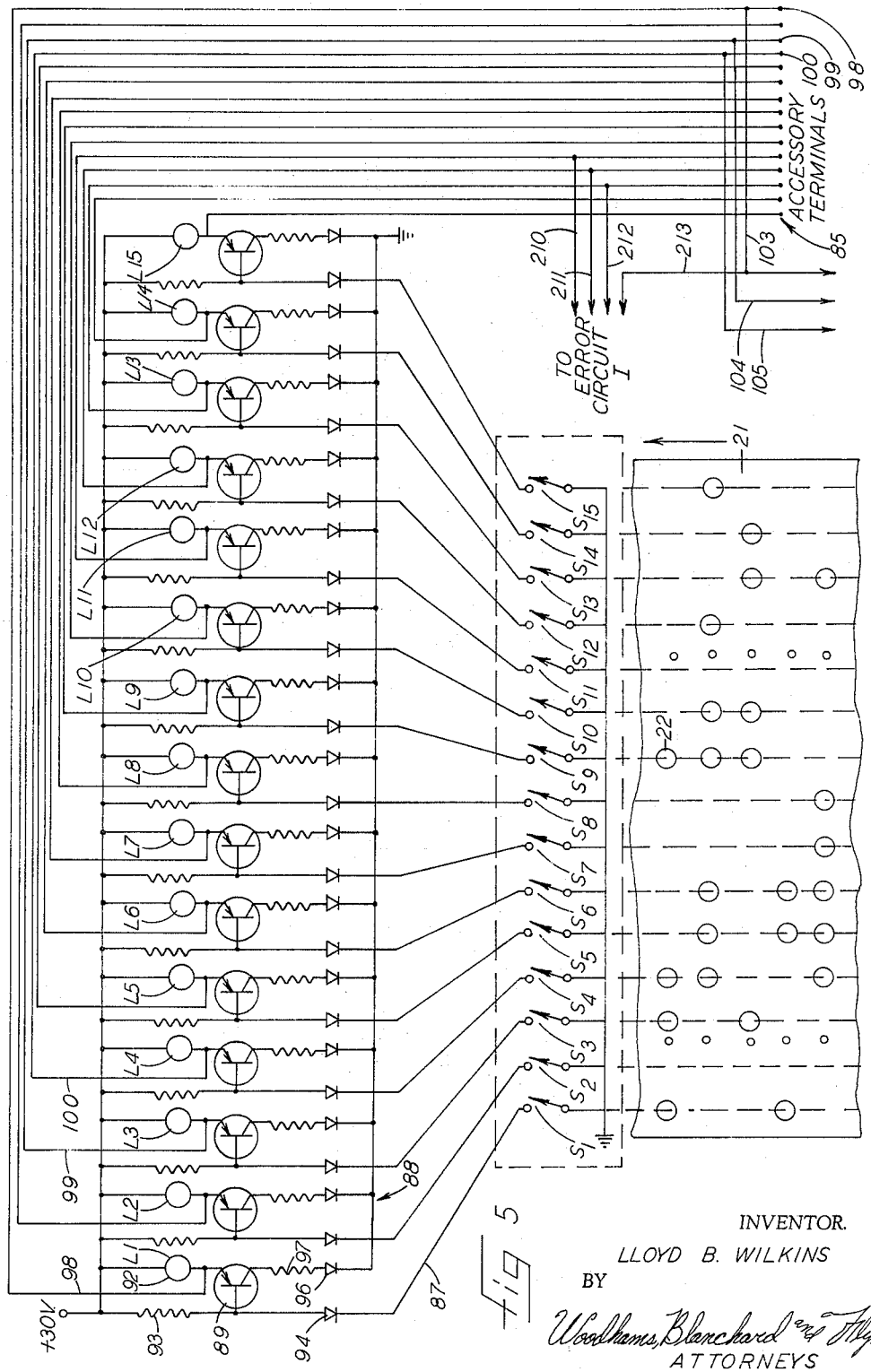

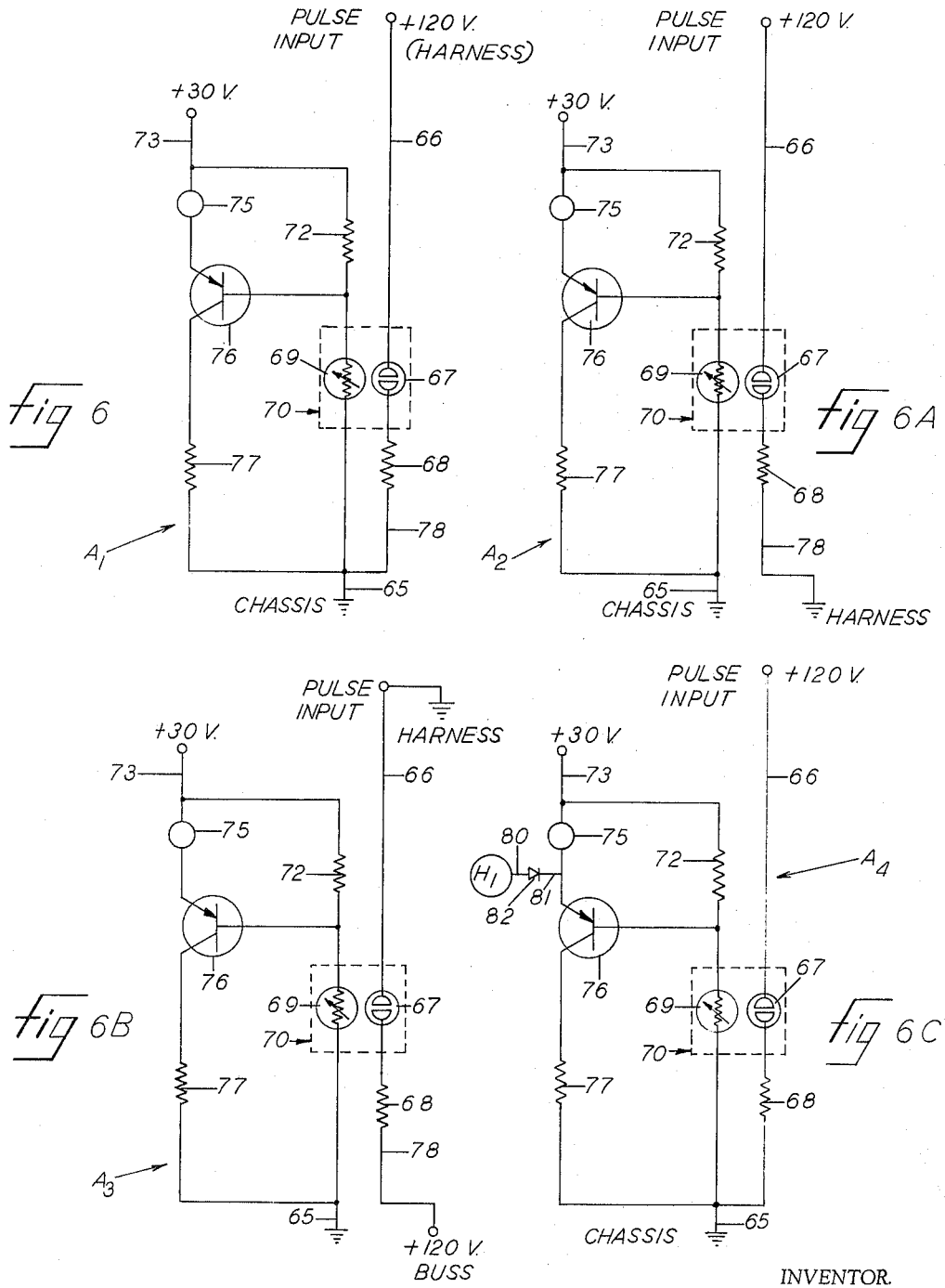

May 10, 1966     L. B. WILKINS     3,250,192
MONITORING DEVICE FOR AN ELECTRONIC PHOTOGRAPHIC MACHINE
Filed April 17, 1963     10 Sheets-Sheet 7
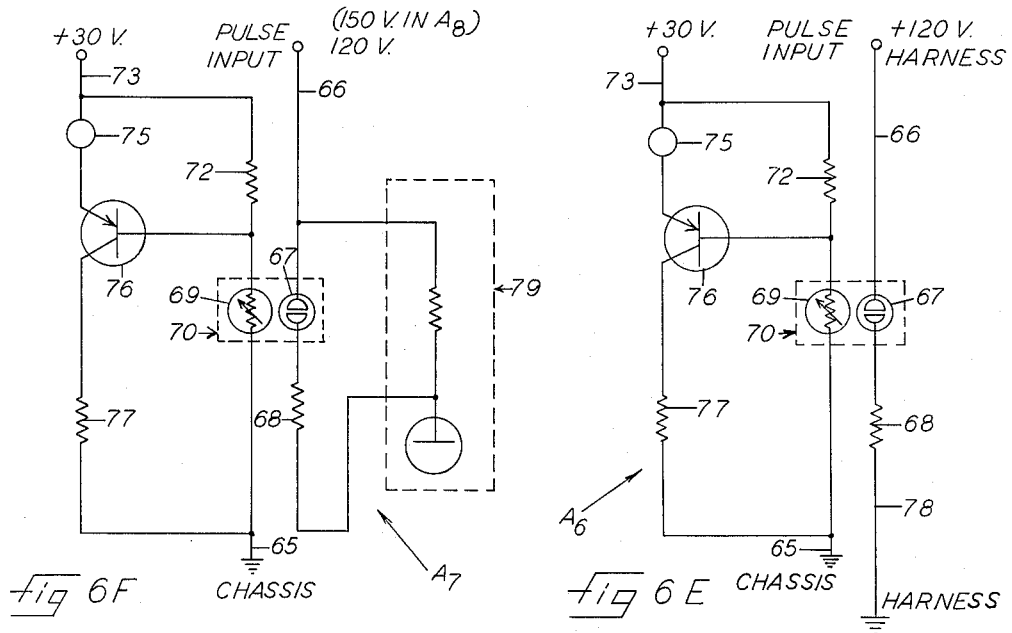
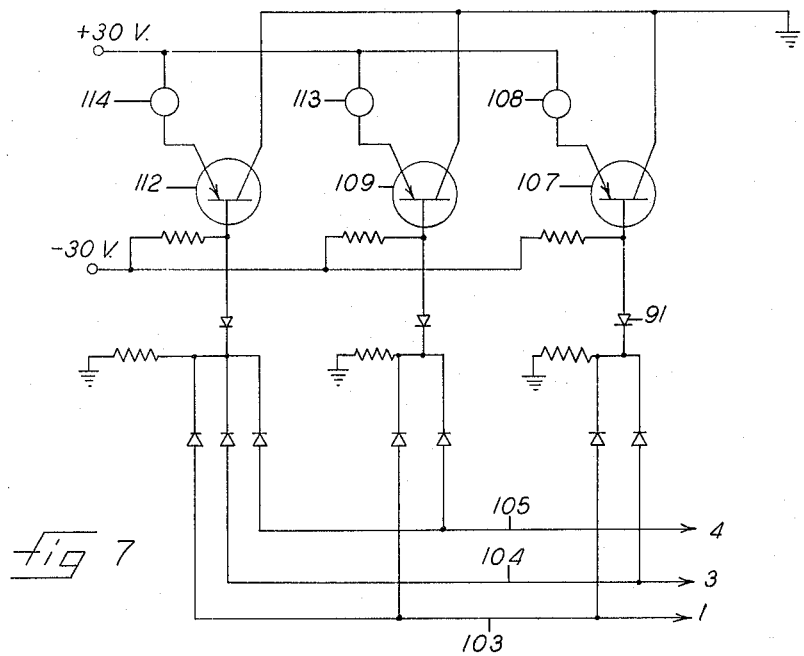
INVENTOR.
LLOYD B. WILKINS
BY
Woodhams, Blanchard and Flynn
ATTORNEYS

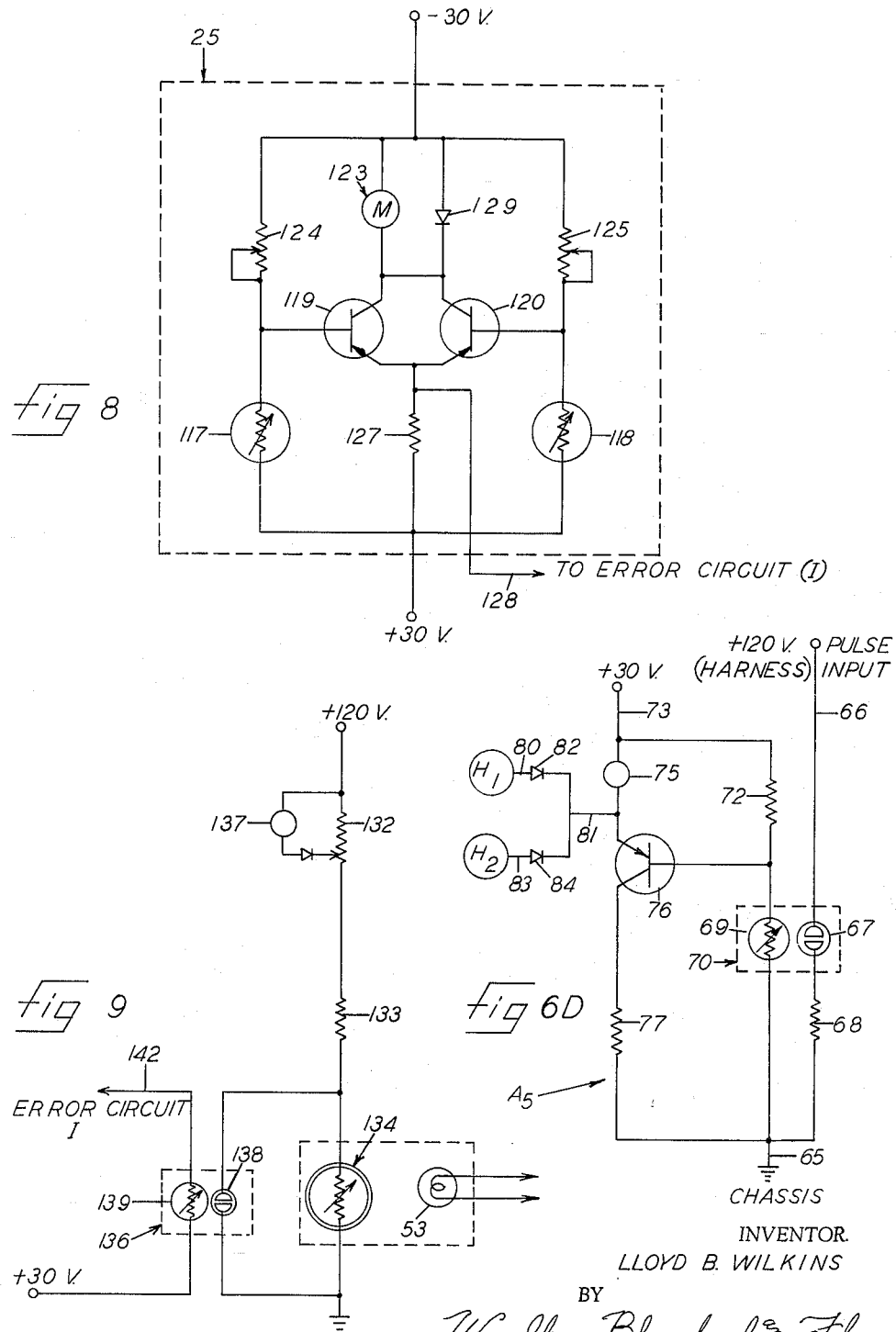

May 10, 1966  L. B. WILKINS  3,250,192
MONITORING DEVICE FOR AN ELECTRONIC PHOTOGRAPHIC MACHINE
Filed April 17, 1963  10 Sheets-Sheet 9
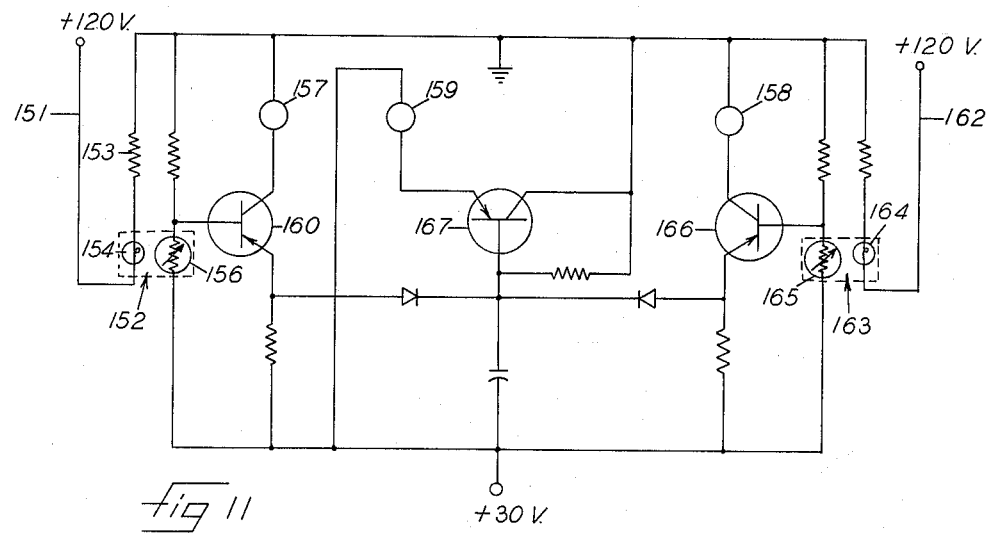
Fig. 11
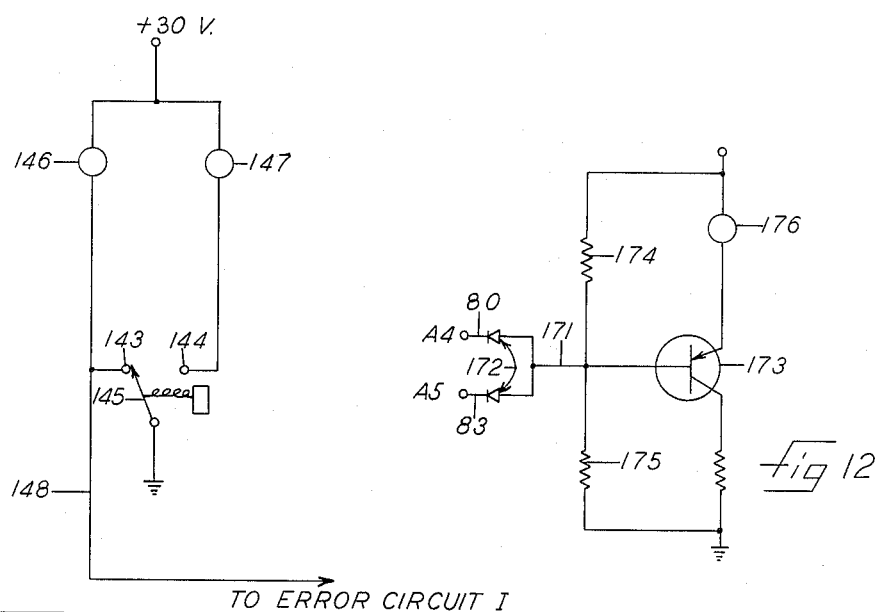
Fig. 10
Fig. 12
INVENTOR.
LLOYD B. WILKINS
BY
Woodhams, Blanchard & Flynn
ATTORNEYS May 10, 1966  L. B. WILKINS  3,250,192
MONITORING DEVICE FOR AN ELECTRONIC PHOTOGRAPHIC MACHINE
Filed April 17, 1963  10 Sheets-Sheet 10
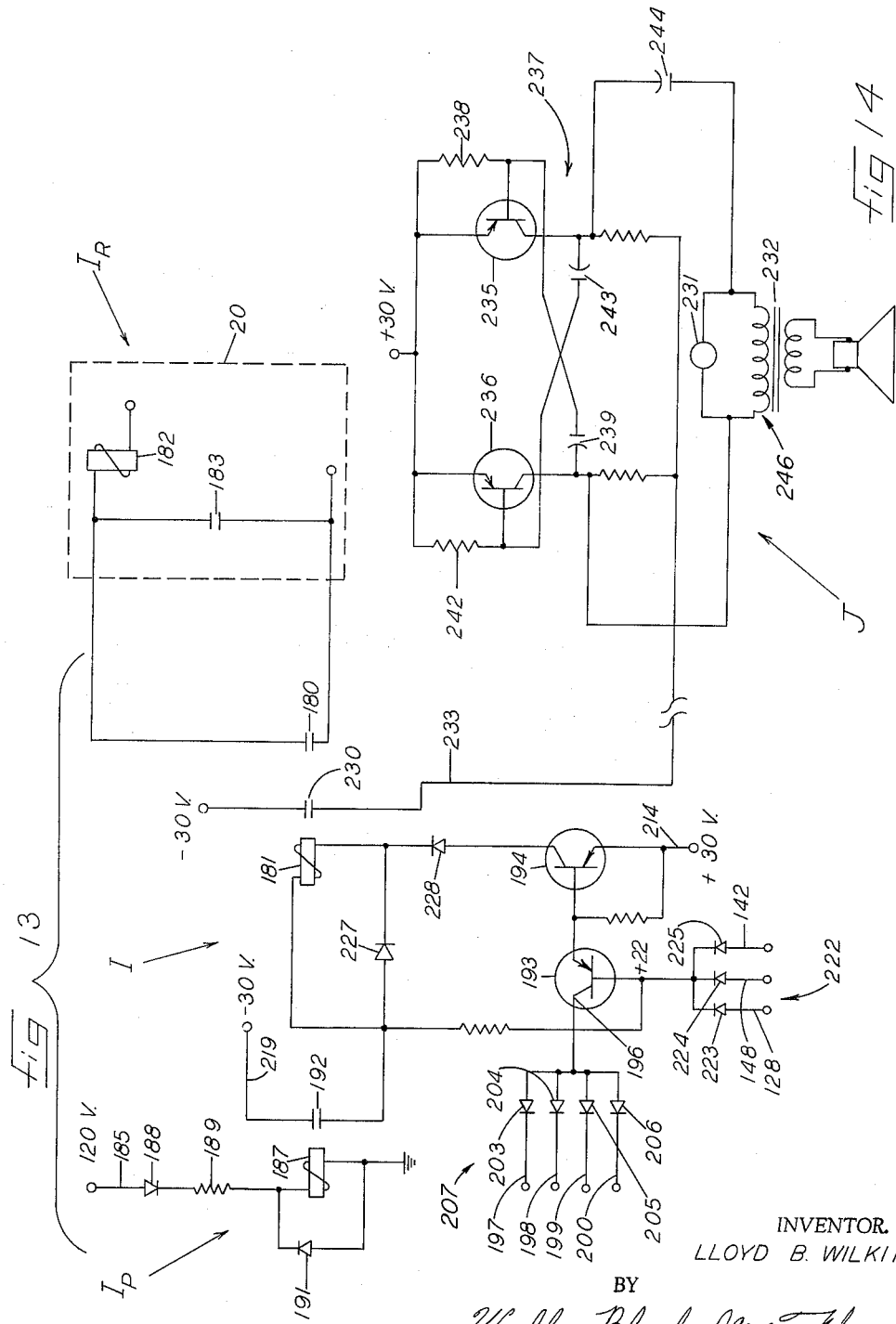
INVENTOR.
LLOYD B. WILKINS
BY
Woodhams, Blanchard and Flynn
ATTORNEYS

United States Patent Office 3,250,192
Patented May 10, 1966

3,250,192
MONITORING DEVICE FOR AN ELECTRONIC
PHOTOGRAPHIC MACHINE
Lloyd B. Wilkins, Summit Township, Jackson County, Mich., assignor to Memo Electronic Research and Development Corporation, Alamo Township, Mich., a corporation of Michigan
Filed Apr. 17, 1963, Ser. No. 273,627
20 Claims. (Cl. 95—4.5)

This invention relates in general to a control and monitoring apparatus for a photocomposition machine having electronically operated components and, more particularly, to a type of apparatus which visually indicates the condition of the operation and/or malfunctions in the performance of the machine.

Electronic technicians, who specialize in the maintenance of complicated machines, such as photocomposition machines, having complex electronic circuits whereby many functions of the machine are controlled or performed, have long encountered two serious maintenance problems which even the most skilled of such technicians have been unable to overcome. In the first place, where the electronic machine is adapted to perform many functions in a sequence, it is often very difficult to pinpoint the precise location of the failure in the machine when a failure occurs. Moreover, due to the fact that photographic procedures are being performed by the machine, the operating mechanism of the machine must be totally enclosed during such operation. Furthermore, many such machines are relatively large so that a breakdown in their performance can occur in widely separated parts of the machine, some of which are difficult to reach. Yet, insofar as outward appearances are concerned, such widespread failures can often produce substantially the same type of stoppage indicator. Accordingly, it has, in the past, been necessary for the electronic technician to check out substantially the entire system each time a breakdown occurs. Even the most skilled technician is, according to present practices, able to pinpoint immediately only certain types of breakdowns in the operation of the machine.

Almost always, a breakdown in the proper operation of a photocomposition machine occurs when it is being used. Accordingly, the breakdown necessarily and adversely affects many other operations which are dependent upon the copy produced by the photocomposition machine. For example, where the photocomposition machine is being used by a newspaper, the breakdown can produce very costly delays. In fact, the "down" time of such a machine with the present equipment for detecting failures can be so large that some newspaper establishments find it necessary to maintain a "standby" machine which can be quickly put into operation in the event that a series of breakdowns should occur in the operation of the regular machine.

However, by using the monitoring apparatus or device of the invention, it is possible for electronic technicians to maintain operation of the machine at a high level of efficiency, even when said technicians are not specialists in the operation of the particular machine involved. That is, electronic technicians who are acquainted only generally with the type of circuitry found in the particular photocomposition machine can, by using the monitoring device of the invention, quickly and easily locate the point at which a malfunction has occured, even though said technicians are not well acquainted with the particular machine or the functions which it performs.

Another extremely serious problem results from the fact that certain types of electronically operated machines, such as photocomposition machines, are frequently controlled by a memory device, such as a magnetic or perforated tape. The machine decodes from the tape operating instructions and characters to be photographed, and then follows such instructions to produce a correct arrangement of the characters on a photographic film. In the past, all errors in the tape have resulted in errors on the film, which latter errors have been detachable only after the tape has been run and the complete photographic copy has been removed from the machine. To correct such errors, either the tape must be discarded and a new, correct tape must be punched, or the faulty tape must be visually scanned to locate the error therein and said error must be manually removed from the tape. Thereafter the new or corrected tape must be rerun to provide the corrected photographic copy. Either method of tape correction, plus the rerunning of the tape, results in a considerable loss of time and money.

On the other hand, if the error in the tape could be located as the tape is read by the machine, and before the erroneous instruction is followed by the machine, then the tape could be corrected immediately, after which the photography could be continued until the block of copy is completed without error therein. This would materially reduce the amount of incorrect copy leaving the machine to be detected at the layout tables where correction necessitates the complete repetition of tape preparation and photography as outlined above.

As a practical matter, incorrect characters and small errors in the space or width allotted to each character need not be detected before photography because these errors can be easily corrected on the layout table. However, for example, when the tape does not provide an adequate number of spaces between successive letters, so that two or more letters are overlapped upon each other, which often occurs in the middle of a long run of copy, such an error can be overcome only by re-punching the line involving the incorrect portion of the tape, or locating the error in the tape and hand correcting the tape. Thus, correction of such an error before photography is highly desirable and is made possible by the monitoring device of this invention.

With the monitoring device of my invention, I was able to reduce by 65 percent the amount of "down" time on a machine containing my invention by comparison with the amount of "down" time on a similar machine performing substantially the same functions, but not equipped with my device.

Accordingly, a primary object of this invention has been the provision of an apparatus for monitoring the proper operation of selected components of the machine and/or detecting certain malfunctions in a machine, such as a photocomposition machine, which performs many functions programmed or controlled by electronic circuitry.

A further object of this invention has been the provision of a monitoring apparatus, as aforesaid, which indicates visually the precise location of the malfunction in the machine when a malfunction occurs in its operation and which is capable of stopping the machine when certain malfunctions occur which would otherwise result in a substantial loss of time and effort.

A further object of this invention has been the provision of a monitoring apparatus, as aforesaid, which is sufficiently self-contained and versatile that it can be applied to a variety of existing photocomposition machines, for example, without materially modifying, to any great extent, the circuitry of the machine and without distributing in any way the normal, desired function of the machine.

A further object of this invention has been the provision of a monitoring apparatus, as aforesaid, which can be operated and understood by electronic technicians who are unfamiliar with the particular machine involved as easily as by technicians who are well acquainted with the machine involved so that the machine can be maintained with a minimum of "down" time by electronic technicians who are not necessarily specialists in the operation of the particular machine involved.

A further object of this invention has been the provision of a monitoring apparatus, as aforesaid, which is relatively easy to install, which is simple in its operation, which is compact and semiportable in its arrangement, and which has a panel easily connected to the machine for which it is designed.

Other objects and purposes of this invention will become apparent to persons familiar with this type of equipment upon reading the following specification and examining the accompanying drawings, in which:

FIGURE 5 is a schematic view of the "read" head tape content circuit, which is identified as E in the diagram of FIGURE 2.

FIGURE 6 is a schematic diagram of the pulse converter and trigger circuit, which is identified as $A_1$ in FIGURE 2.

FIGURE 6A discloses modification $A_2$ of the circuit $A_1$ shown in FIGURE 6.

FIGURE 6B discloses modification $A_3$ of the circuit $A_1$ shown in FIGURE 6.

FIGURE 6C discloses modification $A_4$ of the circuit $A_1$ shown in FIGURE 6.

FIGURE 6D discloses modification $A_5$ of the circuit $A_1$ shown in FIGURE 6.

FIGURE 6E discloses modification $A_6$ of the circuit $A_1$ shown in FIGURE 6.

FIGURE 6F discloses modifications $A_7$ and $A_8$ of the circuit $A_1$ shown in FIGURE 6.

Figure 2:
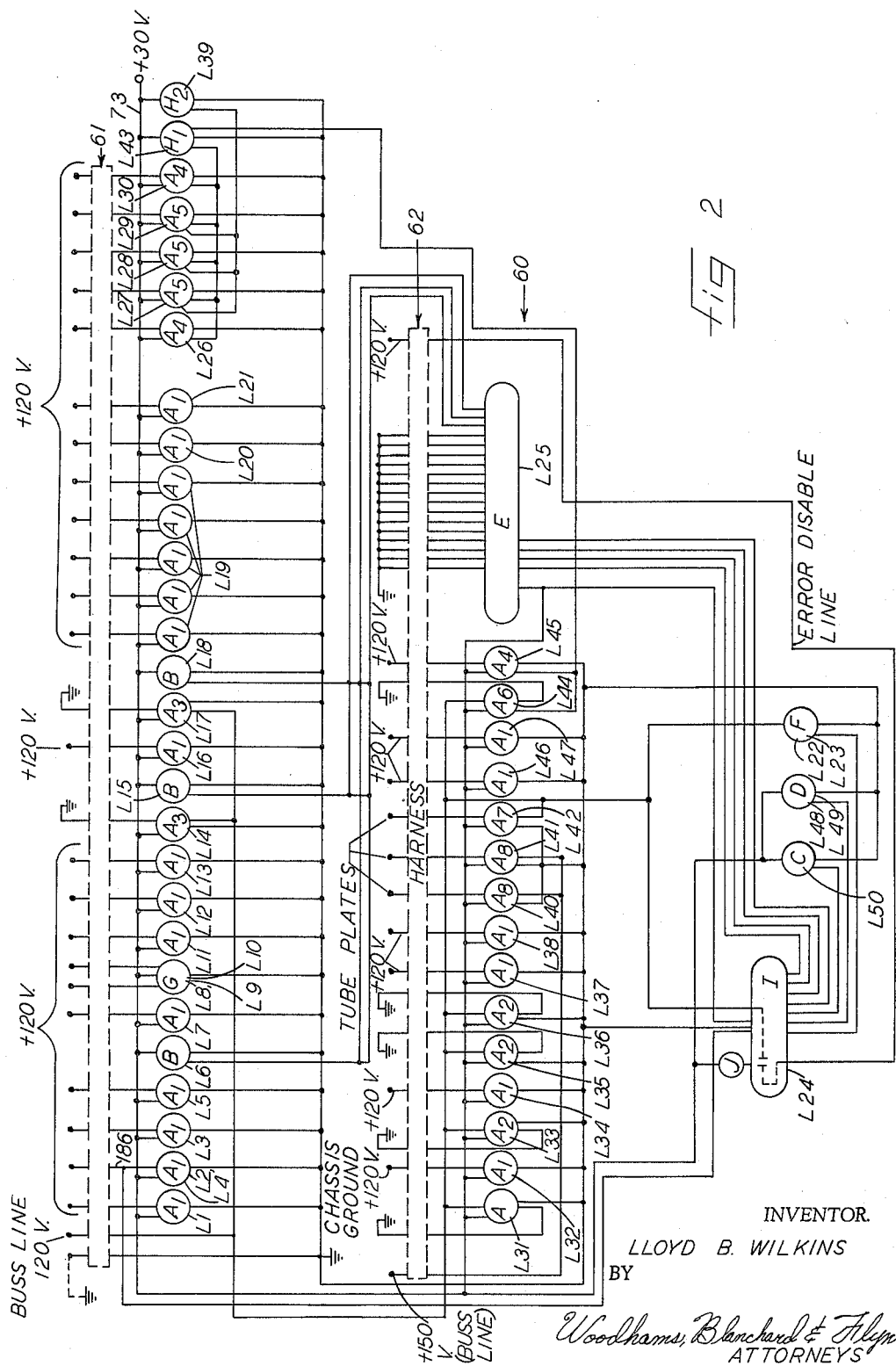
FIGURE 2 is an abbreviated and simplified diagram of the entire control and monitoring apparatus of the invention.

FIGURE 7 is a schematic diagram of the primary functions circuit which is identified as B in FIGURE 2.

FIGURE 8 is a schematic diagram of the temperature sensing circuit identified as C in FIGURE 2.

FIGURE 9 is a schematic diagram of the lamp fault detection circuit identified as D in FIGURE 2.

FIGURE 10 is a schematic diagram of the grid fault detection circuit, which is identified as F in FIGURE 2.

FIGURE 11 is a schematic diagram of the point size range circuit, which is identified as G in FIGURE 2.

FIGURE 12 is a schematic diagram of the sequence indicator circuit, which is identified as H in FIGURE 2.

FIGURE 13 is a schematic diagram of the error circuit, which is identified as I in FIGURE 2 and which includes the precondition circuit $I_P$ and the relay circuit $I_R$.

FIGURE 14 is a schematic diagram of the error indicator circuit, which is identified as J in FIGURE 2.

*General description*

The objects of the invention have been met by providing a monitoring device capable of attachment to a photocomposition machine wherein the performance of various components of said machine can be visually monitored by a plurality of control lamps displayed on a panel. When the machine is operating, the sequence of events occurring therein is displayed on the panel. Moreover, the monitoring device gives a visual indication of the state of the data fed into the machine by the tape. In cases wherein the machine malfunctions, so as to endanger the quality of the photographic image being produced, or disturb the normal operation of the machine, the monitoring device disables the operating circuitry of the machine in specific instances and/or indicates to the technician the point in the machine where the malfunction occurred and the type of failure, either electrical or mechanical.

As discussed above, insufficient spacing between adjacent letters usually results in a serious typographical error in the copy, because (in the past) it usually necessitated detection followed by rerunning of at least part of the copy. The monitoring device of the invention has been designed so that it will detect serious errors of this type and stop the machine before it can print this error on the film or otherwise perform improperly.

*Detailed description*

It will be apparent as the description is developed that the control apparatus of the invention can be adapted by only minor modifications for use on a variety of different electronically operated, photocomposition machines. Thus, reference hereinafter to the Linofilm Photographic Unit, which is manufactured by the Linofilm Division of the Merganthaler Linotype Company of Brooklyn, New York, is for illustrative purposes only and is not intended to limit in any way the scope of the invention. However, since the invention was developed as a result of problems encountered during the operation of the "linofilm" machine, the invention is advantageously described hereinafter in terms of the embodiment applied to said "linofilm" machine. In order to facilitate this description, a brief disclosure of the "linofilm" machine will be provided herein.

In view of the rather substantial amount of circuitry involved in the control and monitoring apparatus of the invention, its content will be summarized briefly in terms of the simplified diagram of FIGURE 2, after which the component circuits contained in FIGURES 5 through 14, inclusive, which are identified in FIGURE 2 by capital letters A through J, will be described in detail.

Figure 3:
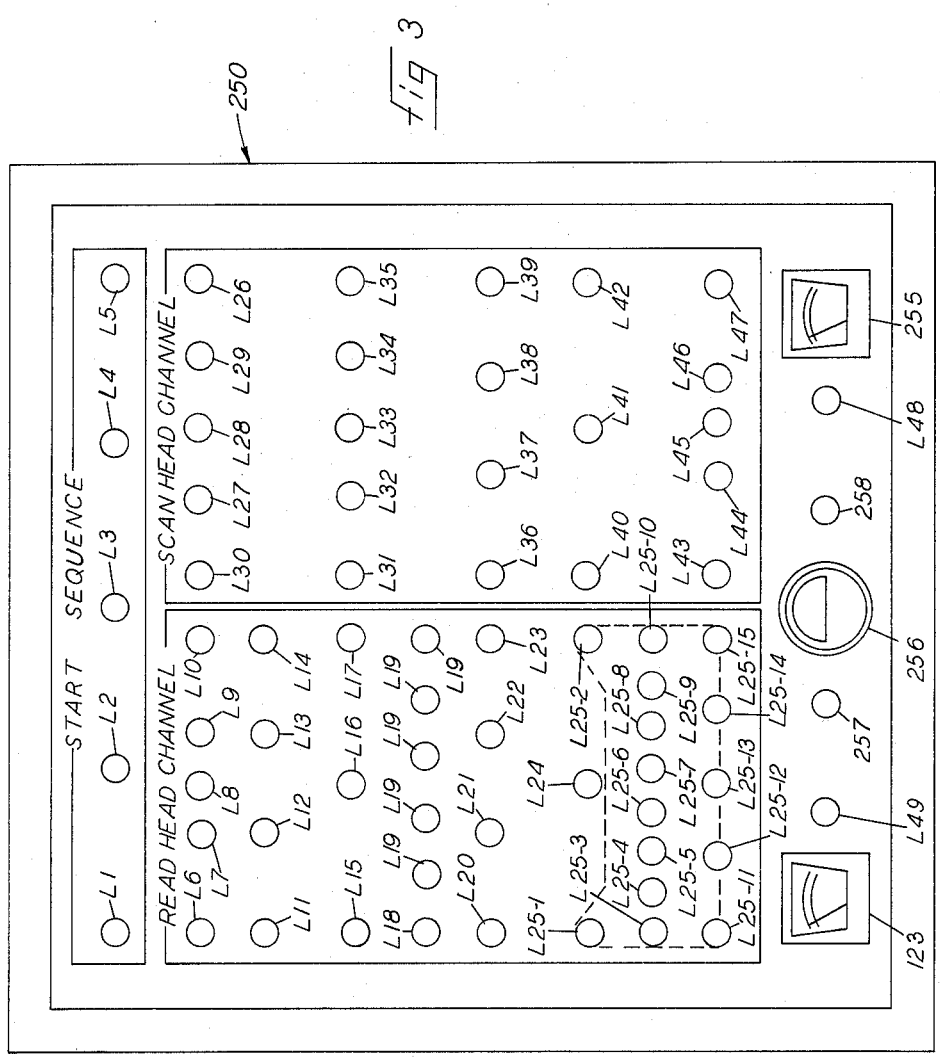
FIGURE 3 is a plan view of the light and meter panel by which the performance of the machine can be visually monitored.

Several of the component circuits are duplicated in the complete circuit of the control and monitoring apparatus. Thus, the monitor lamps on the light and meter panel of FIGURE 3 are related by their designations to the parts of the "linofilm" machine shown in the block diagram of FIGURE 4, and also to the specific portions of the circuit, where applicable, disclosed in FIGURE 2.

*The "linofilm" photographic machine*

Information is fed to the "linofilm" machine 20 (FIGURE 1) by a tape 21 which is fed through a tape receiver 23 containing a "read" head 24 and a "scan" head 26. The tape 21 has (15) stations crosswise of the tape at which holes 22 (FIGURE 5) can be punched through the tape. The holes 22, which represent recorded information, actuate appropriate switches $S_1$ to $S_{15}$, inclusive, in the heads 24 and 26 (FIGURE 1), whereby the information on the tape 21 is converted to electrical impulses. These impulses are conducted through the sequence and control circuitry 27 of the machine 20 to effect predetermined performance of the various parts of the machine 20.

The "read" head 24 decodes from the tape 21 all of the major functional information thereon which is used to operate the machine, such as the point size of the type, the film advance, the type of grid, all character codes, all character width information, and the spacing between words.

The "scan" head 26, which receives the tape 21 before it passes through the "read" head 24, responds only to the information on the tape at the end of each line of copy for the purpose of locating such line on the photosensitive film. Thus, the "scan" head, which is always one line ahead of the "read" head, causes the machine to place the copy, decoded by the "read" head, on the film in a location which has been set into the machine by the "scan" head.

The sequence and control circuitry 27 (FIGURE 1) of the machine serves to program the operation of the various elements in the machine in an established manner. Briefly, the machine 20 includes a flash lamp 28 which is arranged so that the light therefrom passes through a condensing lens 29 and a shutter assembly 32. A grid transport device 33 is arranged in the machine to select a grid 34 from the grid storage rack 36 and place it in the light path 37 between the lens 29 and shutter assembly 32.

A pair of lenses 38 and 39 are mounted upon the parallel guide rails 42 and 43 for movement lengthwise thereof with respect to each other and with respect to the shutter assembly 32. The lenses 38 and 39 control the point size of the images of the characters projected from the grid 34 by the light beam 37 upon the mirror 44, which is supported upon the scanning carriage 46. The scanning carriage 46 is supported upon the rails 42 and 43 for movement lengthwise thereof by means including the scanning motor 47 and the drive screw 48. The mirror 44 reflects the beam 37 at an angle of 90 degrees to its original direction onto the film 50 in the cassette 49.

Movement of said scanning carriage 46 (FIGURE 1) along said rails 42 and 43 is used to produce a series of pulses, which are proportional in number to the extent of movement of the carriage. The pulse-producing device includes a slotted plate 52 which moves with the carriage 46 and which passes between a fixed light source 53 and a fixed bank of photocells 54, which are electrically connected to the control circuit 27. The film 50 in the cassette 49 is advanced by the film drive 56 and the transport drive 57.

The machine 20 (FIGURE 1) operates in response to the information decoded from the tape 21 by the tape receiver 23. That is, the "scan" head 26, which receives the tape first, quickly passes the tape until it reaches the point on the tape which constitutes the end of the first line of copy. At this point, the "scan" head decodes the "end-of-line" information on the tape and electronically stores such information for use by the machine when the information on said tape preceding said end-of-line information is decoded by the "read" head 24. The "scan" head is immediately thereafter advanced to the end-of-line code for the second line and stops. The end-of-line information, as is well known, concerns the proper placement of the line of copy on the film in a direction crosswise of the film.

The character content of the first line of copy on the tape is now advanced through the "read" head 24 which decodes the information on said tape required to lay the characters on the photosensitive film. The slotted plate or pulse generator 52 controls the advancement of the scanning carriage 46 along the rails 42 and 43 by controlling the operation of the scanning motor 47, in response to the number of pulses decoded from the tape 21. Such pulsing includes not only the width of the character, but also the space between the characters.

The "read" head also decodes the film advance and the font or grid change for a given line of copy. That is, the "read" head decodes from the tape information which causes the grid transport device 33 to move the proper grid 34 (FIGURE 1) from the grid rack 36 into the light path 37, and causes the lenses 38 and 39 to move along the rails 42 and 43 so that each line of images is placed upon the film 50 in the proper size and in sharp focus. The "read" head also decodes the information which controls the spacing between the adjacent lines in the copy.

Further specific details of operation for the "linofilm" machine 20 can be determined by examining the manufacturer's specifications of such machine. The foregoing description is believed to be sufficient to understand the application of the control apparatus 60 of the invention (FIGURE 2). Moreover, it will be recognized that details of other existing photocomposition machines with which said control apparatus, after minor modification thereof, can be adapted, are also available in their manufacturer's specifications.

*Circuitry in general*

The monitoring apparatus of the invention has been adapted to monitor the sequencing and operation of selected parts of the above-described photocomposition machine 20 (FIGURES 1 and 4) where a critical malfunction can and/or is likely to occur at unpredictable times. Although there are a large number of such parts in the photocomposition machine which perform both mechanical and electrical functions, many of these parts can be monitored by the same type of pickup. That is, the types of different signals, which must be sensed to monitor the malfunctions of the selected parts, are relatively few in number by comparison with the number of parts in which such malfunctions can occur.

The signal-producing parts of the machine are either electrical or electro-mechanical in nature, and they produce electrical impulses when a malfunction occurs. These selected parts are monitored by a control apparatus 60 (FIGURE 2) having a plurality of component circuits, which are shown in FIGURES 5 to 14, inclusive. Since the monitoring of the photocomposition machine is accomplished by the apparatus 60 while the machine 20 is in operation, the control apparatus 60 is arranged and connected to said machine so that the functioning of the machine is not adversely affected by such monitoring.

The component circuits, identified by the capital letters A through J, inclusive (FIGURE 2), are connected to the machine 20 by a harness including the connectors 61 and 62, for example. The connectors 61 and 62, each of which may be in several parts, are preferably of the type which can be inserted or plugged into the sockets provided for the connectors (not shown) which connect the control circuit 27 of the machine to these same parts. The connectors 61 and 62 are preferably designed to receive the connectors from the control circuit 27 of the machine 20.

Some of the various terminals on the connectors 61 and 62 are indicated in FIGURE 2 as connected to parts of the "linofilm" machine 20 (FIGURES 1 and 4), and some terminals are identified as connected to sources of potentials or ground. However, it will be recognized that such specific reference is made for illustrative purposes and, depending upon the specific type or model of photocomposition machine, might be varied materially. That is, the voltages might be higher or lower than those indicated and certain of these terminals might be omitted on selected machines.

For convenience, the detailed description of each component circuit will be followed herein by a brief summary of the opperation or functioning of said component circuit. The over-all operation of the entire apparatus will be discussed thereafter as part of and in conjunction with the description of the light panel in FIGURE 3.

The component circuit $A_1$ (FIGURE 6) has seven additional forms identified as $A_2$, $A_3$, $A_4$, $A_5$, $A_6$, $A_7$ and $A_8$, which are disclosed in FIGURES 6A to 6F, inclusive. The circuit $A_1$ will now be described completely, and the variations in the circuit $A_1$, which produce the circuits $A_2$ to $A_8$, inclusive will be discussed in terms of the circuit $A_1$.

The basic $A_1$ circuit (FIGURE 6) is herein referred to generally as the pulse circuit. Each $A_1$ circuit, of which there are twenty-two in this particular embodiment (FIGURE 2), has a pulse input line 66, which is connected to the machine 20 through one of the connectors 61 and 62. Said input line 66 is connected in series through the neon lamp 67 and the voltage dropping resistors 68 to the ground line 65. The neon lamp 67, in this particular embodiment, is part of a pulse transducer assembly 70 including a photocell 69. The lamp 67 and photocell 69 are sealed within an epoxy resin, for example, so that the illumination of the lamp 67 can impinge upon the photocell 69. By this means, a high potential, such as from 100 to 300 volts D.C., appearing in the line 66 can be converted into a low voltage output from the photocell 69.

One terminal of the photocell 69 is connected to ground and the other terminal is connected in series through the bias resistance 72 to a 30 volt D.C. source identified by the line 73 in FIGURES 2 and 6. A lamp 75 is connected in series with the emitter circuit of the transistor 76 and both are in turn connected in parallel with the resistance 72 between the 30 volt source and the pulse transducer 70. The collector circuit of the transistor 76 is connected in series with the resistance 77 to the ground line 65.

The transistor 76 is connected in an emitter-follower configuration and it is normally reverse bias in the emitter-to-base circuit by the bias resistor 72. Absence of a pulse in the line 66 will maintain the transistor 76 in the cutoff condition.

When a trigger pulse appears in the line 66, the neon lamp 75 is illuminated and the resistance of the photocell 69 drops to a value dependent inversely upon the intensity of the illumination from the lamp. The resistor 72 is selected to allow the resistance of the photocell 69 to pull the base-to-emitter circuit of the transistor into the area of conduction rapidly. This arrangement assures an illumination of the lamp 75 with each pulse which triggers the base of the transistor 76. The resistor 68 is selected to permit a maximum of intensity of illumination from the neon lamp 67 in response to a pulse in the line 66. The resistor 77 limits the current flow from the collector to the emitter in the transistor 76 and thereby prevents thermal runaway under high temperature conditions.

The circuit $A_1$ (FIGURE 6) is modified to provide the $A_2$ circuit (FIGURE 6A) by disconnecting the line 78 from the ground line 65 and connecting the line 78 to ground through the harness connectors 61 or 62.

The $A_3$ circuit (FIGURE 6B) is like the $A_1$ circuit except that the input line 66 is connected to ground through the harness connectors 61 or 62, and the line 78 is disconnected from the ground line 65 and is connected to the 120 volt D.C. buss line through one of the connectors 61 and 62.

The $A_4$ circuit (FIGURE 6C) includes a circuit $A_1$ to which an output line 81 is connected at a point in the emitter circuit between the lamp 75 and the transistor 76 for the purpose of monitoring a secondary function. The line 81 is connected to the H circuit (FIGURES 2 and 12) through the diode 82 and the conductor 80. The diode 82 prevents reverse current flow from the H circuit to the $A_4$ circuit.

The $A_5$ circuit (FIGURE 6D) differs from the $A_4$ circuit (FIGURE 6C) only in that the conductor 81 is connected by the line 83 through another diode 84 to another H circuit (FIGURE 12) for the purpose of monitoring another secondary function.

The $A_6$ circuit (FIGURE 6E) is identical with the $A_2$ circuit (FIGURE 6A), except that the 120 volt input to line 66 comes from the 120 volt D.C. buss line (FIGURE 2).

Figure 1:
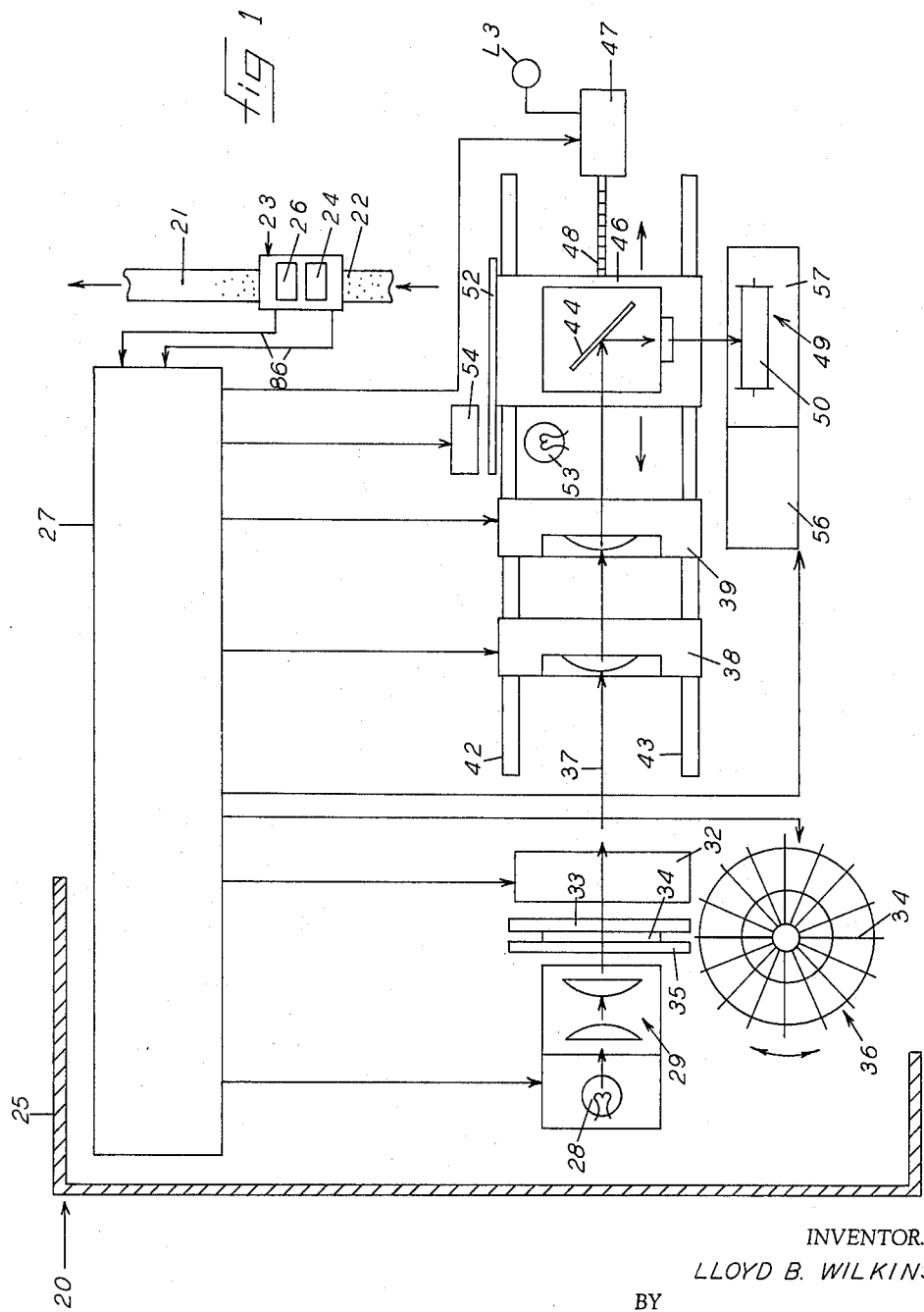
FIGURE 1 is a diagrammatic view of a photocomposition machine with which the control and monitoring apparatus of the invention may be used and is disclosed.

The $A_7$ circuit (FIGURE 6F) is similar to the $A_2$ circuit (FIGURE 6A) except that the line 78 is disconnected from ground and connected to a tube circuit 79, which is also connected to the line 66. The tube circuit 79 is part of the machine 20 (FIGURE 1).

The $A_8$ circuit (FIGURE 6F) is identical with the $A_7$ circuit except that the input to line 66 is 150 volt D.C.

FIGURE 5 illustrates the "read" head tape content circuit, which is identified as E on the master circuit of FIGURE 2. The tape 21 (FIGURES 2 and 5) passes through the "read" head 24 which contains, in this particular embodiment, fifteen switches $S_1$ through $S_{15}$, inclusive, FIGURE 5. These switches are connected to the "read" head tape content circuit E for the purpose of monitoring all "read" head information which is in the perforated tape 21. It also provides output pulses to the primary functions circuit B (FIGURES 2 and 7), which will be described hereinafter. Further, the "read" head tape content circuit E provides pulses to the error circuit I (FIGURES 2 and 3), which is discussed hereinafter. Since it is the function of the switches $S_1$ through $S_{15}$, inclusive, to supply pulses to the "linofilm" machine 20 (FIGURE 1), said "read" head tape content circuit E (FIGURE 5) is of necessity also connected to said "linofilm" machine. The conductors 86 (FIGURE 1) illustrate this connection broadly.

Each of the switches $S_1$ through $S_{15}$ is connected in series by a conductor 87 to a trigger circuit 88 containing a trigger transistor 89. There are fifteen spaced stations across the tape 21 in which holes 22 are punched to operate the switches $S_1$ through $S_{15}$. Thus, in this particular embodiment, there are fifteen trigger circuits 88 each of which is connected to a switch. Each trigger circuit includes a lamp 92 which visually indicates that a punched hole has passed under its corresponding switch in the "read" head 24.

The transistor 89 in each trigger circuit 88 is connected in the emitter-follower configuration. Since each switch $S_1$ through $S_{15}$ (FIGURE 5) actuates existing circuitry 27 (FIGURE 2) within the photographic unit 20, a high input impedance (or resistance) circuit is advantageously provided by the transistor 89. The resistor 93 provides necessary reverse bias for the emitter circuit to remain cut off so that the lamp 92 is extinguished. The rectifier 94 isolates the base-to-collector circuit of the transistor 89 from leakage current which can flow to ground through the conductor 87 from the existing vacuum tube circuits 27 (FIGURE 2) in the photographic unit. The rectifier 96 polarizes the collector circuit and thereby prevents the occurrence of positive variations in potential below the rectifier 96, which would overload the transistor 89, if the transistor 89 should attempt to conduct when the base thereof is at ground potential. The resistor 97 limits current flow in the collector circuit of transistor 89 so that it does not exceed a safe value when the emitter circuit is cut off and the collector-to-base circuit forwardly biased.

Each trigger circuit 89 (FIGURE 5), of which there are fifteen in the "read" head tape content circuit, is substantially identical with the trigger circuit described in the foregoing paragraphs. Thus, if a punched hole 22 appears in the tape under any one of the "read" head switches $S_1$ through $S_{15}$, the corresponding switch will be closed whereby the base element of the transistor 89 connected to that switch will assume a negative potential. This potential will cause the emitter-to-base region of the transistor 89 to be forwardly biased and the lamp 92 in the corresponding trigger circuit 88 will be lighted to indicate the existence of the punched hole. This particular action is typical for each of the trigger circuits 88.

The transistors 89 in the trigger circuits 88 associated with the switches $S_1$, $S_3$, $S_4$, $S_{11}$, $S_{12}$ and $S_{13}$ also provides outlets to other monitoring circuits for the purpose of detecting erroneous coding in the tape and/or erroneous decoding by the "read" head. These outputs are taken from the emitter circuits. The output lines 98, 99 and 100 are connected by the conductors 103, 104 and 105, respectively, to the primary function circuit B (FIGURE 7) and there used to verify the decoding, by the "read" head switches, of the three primary preconditioning codes for operation of the "linofilm" machine. These preconditioning codes are the point size, film advance and font or grid change. The common code for point size is characterized by holes in the tape 21 which appear simultaneously under the switches $S_1$ and $S_3$. The film advance code is designated by holes which appear at the same time in the tape 21 under switches $S_1$ and $S_4$. The grid change code is characterized by holes appearing simultaneously in the tape 21 under switches $S_1$, $S_3$ and $S_4$. In this embodiment, the holes for the preconditioning codes lie in a row transversely of the tape 21.

To determine the validity of the foregoing tape information, the outputs from those trigger circuits 88 which are connected to switches $S_1$, $S_3$ and $S_4$ are taken in selected combinations and fed to the logic "and" gates in the primary function circuit B (FIGURE 7). Normally the output voltage from the primary functions "and" gates (FIGURE 7) is positive, such as 30 volts. This prevents the transistors from coming on until proper coding is at the "read" head switch contacts, and the tape content output levels are negative in respect to the positive 30 volt reference.

Should a common code for point size appear on the tape 21, switches $S_1$ and $S_3$ will close so that a reduced positive voltage, which is relatively negative in respect to the emitter of the transistors 89 in the corresponding trigger circuits, will appear at the base of such transistors 89. This produces a relatively negative voltage in the emitter circuits of said transistors 89 which then appears at the appropriate "and" gates in the primary functions circuit B (FIGURE 7). Such negative voltage will trigger the point size transistor 107 so that its lamp 108 will be illuminated. That is, the relatively negative voltages from the emitter circuits of transistors 89 are positive to the ground 90 but negative to the +30 volt reference connected to the base of the transistor 107. The diode 91 isolates the base of transistor 107 until the inputs to lines 103 and 104 are both relatively negative to +30 volt reference.

The film advance transistor 109 (FIGURE 7) and grid change transistor 112 are triggered in a similar manner so that their corresponding lamps 113 and 114, respectively, are illuminated.

The temperature sensing circuit C (FIGURES 2 and 8) provides for the detection of abnormally high or undesirable temperatures within the enclosed, necessarily light tight, cabinet 25 (FIGURE 1) of the "linofilm" machine 20. In this particular embodiment, the circuit C (FIGURE 8) includes front and rear thermistors 117 and 118 which monitor the temperature within the cabinet 25 at two separate locations which are preferably spaced from each other. The temperature sensing circuit C converts the cabinet temperatures proportionally to current flow through a pair of transistors 119 and 120, respectively, and such current flow is utilized to cause a deflection of the needle in the meter 123, which is calibrated for temperature.

The transistors 119 and 120 are both connected to operate as common collector and emitter followers. The transistor 119 responds to variations in the resistance of the thermistor 117 and the transistor 120 responds to the varying resistance of the thermistor 118. Both transistors control the amount of current flow through the meter coil. Resistors 124 and 125 serve as individual, calibrating potentiometers for the purpose of balancing the transistors 119 and 120, respectively, until they are cut off sufficiently to indicate a normal temperature reading on the meter 123. The thermistors 117 and 118 are thereby set to sense a variance in cabinet temperature away from ambient temperature.

Since the resistance of each thermistor varies inversely with its temperature, a rise in temperature in one or both of the monitored areas will cause a reduction in the negative bias on one or both of the transistors 119 and 120, as the case may be. Should the variance be of an unsafe or undesirable magnitude, the affected thermistor will conduct heavily in the collector-to-base circuit and the corresponding increase in current will be indicated by the meter 123. At the same instant, the base-to-emitter circuit of the corresponding transistor will be cut off by the reverse (positive) bias, and the output voltage level from the resistor 127, which is low under normal conditions, will rise to the positive supply voltage. The output line 128 from the emitter circuit forms one of the input lines to the logic positive "or" gate 222 of the error circuit I (FIGURES 2 and 13). As will be seen hereinafter, when the error circuit I is described in detail, the rise in the voltage level across the resistor 127 will cause the "and" gate transistor 193 of the emitter-to-collector circuit in said error circuit I to cut off and thereby activate the error circuit to indicate an undesirable temperature condition in the "linofilm" machine. The rectifier 129 (FIGURE 8) which parallels the meter 123, protects said meter from voltage fluctuations which may appear in the circuit, and from a polarity reversal which may occur due to the appearance of a high amplitude, spike pulse in said circuit C.

The lamp fault detection circuit D (FIGURES 2 and 9), as used with the "linofilm" machine, monitors the condition of the grating illuminant, which is the lamp source of light 53 (FIGURE 1) for the unit pulse generating circuits of the "linofilm" machine. Since the failure of the lamp 53 would prevent the "linofilm" machine from functioning in the normal fashion, that is, by counting pulses, it is important to detect a failure of said lamp 53 as soon as possible after it occurs. Moreover, the physical location of the lamp 53 is such that it can be visually viewed only when the cabinet of the "linofilm" machine is opened by competent maintenance personnel because it is located within the light-tight cabinet 25.

The lamp fault detection circuit D (FIGURE 9) includes a voltage divider consisting of three series connected resistances 132, 133 and 134. The resistance 132 is manually variable and the resistance 134 is a photoresistive cell which varies inversely with the light falling upon it. Resistor 133 limits the current to the photocell 134. The photocell 134 is disposed closely adjacent the light source 53 so that its light impinges upon said photocell 134.

A transducer assembly 136 is arranged in parallel around the photocell 134 for the purpose of converting variations in the relatively high (120 volt) input voltage into relatively low (30 volt) variations which are then fed to the error circuit I (FIGURE 13) for reasons appearing hereinafter.

Normally, the light source 53 will be illuminated and, therefore, the resistance of the photocell 134 will be low so that the voltage drop across the photocell will be small. The largest voltage drop in the voltage divider will appear across the resistance 132 which will produce a potential difference across the lamp 137 and thereby illuminate same. Accordingly, as long as the lamp 137 is illuminated, it can be safely assumed that the source 53 is operative.

However, should the light source 53 fail, the resistance of the photocell 134 will immediately increase to its dark resistance value and a substantially larger voltage drop will now appear across the photocell 134. This will result in a reduction of voltage across the resistance 132 and, therefore, insufficient voltage across the lamp 137 to maintain its illumination, which will be extinguished. On the other hand, the lamp 138 in the transducer assembly 136 will now be illuminated due to the increased potential across the photocell 134, which will immediately cause the resistance of the photocell 139 in the transducer assembly 136 to drop to a new low value which will cause the output potential to the error circuit through the conductor 142 to approach the supply voltage level and thereby activate the error circuit I (FIGURE 13) through the "or" gate 222 thereof.

The grid fault detection F (FIGURES 2 and 10) monitors the mechanical movement of the grid transport device 33 (FIGURE 1) during the normal cycle of grid changing. Switch 145 (FIGURE 10) in the grid fault detection circuit F is a single-pole, double-throw switch having an armature which is spring loaded toward electrical contact with a terminal 143 and away from terminal 144. However, during normal operation of the grid change cycle, the switch 145 is held in contact with terminal 143 so that the green "normal operation" lamp 146 is illuminated and the red "reject" lamp 147 is de-energized. In this condition, the voltage level in the conductor 148, which is connected to the error circuit I (FIGURE 13), will be at ground potential and, therefore, the "or" gate 222 of said error circuit will not be activated.

If a grid 34 (FIGURE 1) is not picked up or properly placed by the grid transport device 33, the mechanical movement of the pressure platen 35 will be maximum and, therefore, the switch 145 will be forced into engagement with the terminal 144. As will be seen in FIGURE 10, this will connect the reject lamp 147 between the supply voltage and ground so that the lamp 147 will be illuminated by the voltage drop and, at the same time, the green lamp 146 will be extinguished, due to the appearance of a positive voltage on both sides thereof. However, since the output level of the conductor 148 will rise to a positive level, due to the open ground circuit, the positive voltage in the conductor 148 will activate the "or" gate 222 of the error circuit I (FIGURE 13).

The point size range indicator circuit G (FIGURE 2 and 11) is utilized to determine the exact range of point size being used in processing the line content information being fed to the "read" head 24 (FIGURE 1) from the tape 21. The "linofilm" machine 20 is capable of providing point sizes ranging from 6 points to 36 points, in three separate ranges. The first range covers all point sizes from 6 points through 12 points, the second range covers all point sizes from 12 points through 24 points, and the third range covers all point sizes from 18 points through 36 points.

When a point size in the second range is dictated to the "linofilm" machine by the tape 21 (FIGURE 1), a relay in the control circuit 27 of the "linofilm" machine is energized and the input line 151 (FIGURE 11) to the transducer assembly 152, which may be substantially identical with the transducer assembly 136 (FIGURE 9) is energized to the 120 volt level. The resistor 153 is selected at a value to provide maximum light intensity from the lamp 154 in the transducer assembly 152 when the voltage pulse appears in the line 151. Accordingly, the voltage drop across the photocell 156 will be decreased so that lamps 158 and 159 will remain unlighted and lamp 157 in the collector circuit of transistor 160 will be lighted by the appearance of a positive voltage on the base of said transistor 160.

When a point size in the third range is dictated to said "linofilm" machine, a relay in the control circuit 27 of said machine is energized so that the input line 162 leading to the transducer assembly 163 is energized to positive 120 volts. Accordingly, the lamp 164 in the transducer 163 is illuminated and the resistance drops in the photocell 165, thus lamp 158 in the collector circuit of the transistor 166 is illuminated and the lamps 157 and 159 remain unlighted.

When a point size in the first range is dictated to the "linofilm" machine, both of the above-mentioned relays in the control circuit 27 are de-energized and the input to both of the transducer 152 and 163 is low. Thus, a positive voltage appears at the base of the transistor 167 and the emitter to base circuit of the transistor 167 conducts so that the lamp 159 is illuminated and the lamps 157 and 158 remain extinguished.

From the foregoing it will be seen that the transistors 160, 166 and 167 comprise a logic "or" circuit. That is, when the transistors 160 and 166 are cut off in their respective collector-to-base. circuits, transistor 167 will conduct in its emitter-to-base circuit and cause the lamp 159 to light. However, if either transistor 160 or 166 conducts in its collector-to-base circuit, transistor 167 will be cut off in its emitter-to-base circuit, hence, its lamp 159 will be unlighted.

The sequence indicator circuit H (FIGURES 2 and 12) receives voltage through logic "or" inputs from various points in the circuit at which it is desirable to monitor secondary functions, for example. These inputs are fed into a conductor 171 through individual rectifiers 172 which prevent reverse flow in a substantially conventional manner. Accordingly, the input voltage in the conductor 171 appears in the base circuit of the transistor 173. The principal function of the sequence indicator circuit is to indicate when a secondary function is taking place and when it has been completed.

The transistor 173 is arranged as a stabilized emitter-follower with the indicator lamp 176 located in the emitter-to-base circuit. The resistors 174 and 175 from a voltage divider which provides a reverse (positive) bias for the emitter-to-base circuit in order to maintain the indicator lamp 176 extinguished. The inputs to the conductor 171, through the polarized gating rectifiers or diodes 172, control the potential level of the base element of the transistor 173. Thus, if any input through any one of the rectifiers 172 assumes a negative potential level, the base-to-emitter circuit will be forwardly biased and the lamp 176 will be lit. As stated above, the rectifiers isolate the individual input lines from the secondary functions with respect to each other and also provide a logic "or" element for determination of its input voltages.

The error circuit I (FIGURES 2 and 13) functions to disable the "linofilm" machine 20 (FIGURE 1), which is being monitored in this particular embodiment by the control apparatus 60 (FIGURE 2), whenever certain malfunctions occur in the operation of said "linofilm" machine. The term "malfunction" includes failures in the performance of the "linofilm" machine and failures which are not merely breakdowns in the sequence of operation. That is, the "linofilm" machine can operate through a complete and seemingly normal sequence and yet have a malfunction in a part of the machine which has operated in said sequence. That is, the sequence can be completed without performing all of the functions which are intended to be performed during such sequence. For example, the grid transport arm 33 (FIGURE 1) could fail to remove a grid from the grid storage rack 36 and place it in the proper position between the condensing lens 29 and the shutter assembly 32. Yet, since the arm 33 has gone through the complete motion required of the transport arm, the sequence of operation of the grid transport arm 33 and the grid storage rack 36 would not have been faulty. Such a malfunction can occur as the result of the lack of a grid 34 in the grid storage rack 36 at the position in which the grid transport arm 33 is attempting to pick up a grid, or, the grid transport arm may drop said grid and continue its normal movement into seating position. The coded information in the tape has no control over the picking up and positioning of the grid after the tape has been initially decoded and the sequence commences. Thus, it is immaterial that the "read" head may have properly dictated the selection of a grid from this particular position in the grid rack pursuant to the coding in said tape.

However, the error circuit I (FIGURE 13) is electrically connected so that failure of a grid 34 to be placed adjacent to the pressure platen 35 will be detected. More specifically, the pressure platen 35 will, in the absence of a grid 34 in said grid transport arm 33, move a greater distance than normal and thereby permit the switch 145 (FIGURE 10) to move under its own bias into engagement with terminal 144. This immediately cuts off the ground from the 30 volt supply through the green lamp 146 so that a relatively high positive voltage will appear in line 148 (FIGURES 10 and 13).

Thus, the foregoing illustrates that a malfunction can be monitored within the "linofilm" machine 20 (FIGURE 1) which will trigger the error circuit I, as discussed hereinafter, without appearing as a breakdown in the sequence of operation of the machine. Disabling of the "linofilm" machine is promptly accomplished by the error circuit I (FIGURE 13). That is, the coil 181 in error circuit I is energized and thereby closes the contacts 180 in the error relay circuit $I_R$ which is associated with the error indicator circuit J (FIGURE 14). Closure of contacts 180 energizes the safety relay coil 182, which is part of the "linofilm" machine 20. Said relay coil 182 is normally energized by the closure of the terminals 183 in said machine when, for example, the access doors, not shown, on the side of the machine cabinet 25 (FIGURE 1) are opened.

The error circuit I includes an error precondition circuit $I_P$ and an error indicator circuit J (FIGURE 14). The precondition circuit $I_P$ has an input line 185 which is connected to and energized by the film vacuum supply solenoid relay line 186 (FIGURES 2 and 4) of the "linofilm" machine. Said line 185 is connected to ground in series through the relay coil 187, the rectifier 188 and the resistance 189. The rectifier 191 is connected in parallel around the relay coil 187. Thus, the precondition relay coil 187 is dependent for its operation upon the appearance of a voltage in the vacuum solenoid line and, during the presence of such voltage, said relay will remain in the energized condition. That is, the coil 187 will close the contacts 192 in the principal error circuit.

Since the 120 volt D.C. potential does not appear in line 185 until the processing of the characters commences, the error circuit remains disabled until such processing commences. However, when the first code on tape 21 representing a character appears under the "read" head 24 (FIGURE 1), and the machine has performed the last primary function, i.e. font change, which is required by the code, the film vacuum solenoid relay (not shown), in the "linofilm" machine is energized and, as a result thereof, 120 volts appears in line 185. Rectifier 188 polarizes the input voltage positive with respect to ground, and resistance 189 drops the voltage to 100 volts D.C. to operate the high resistance relay coil 187. Rectifier 191 damps the coil ring on drop out and suppresses transient potentials which might otherwise be created by the counter E.M.F.

The error circuit I is a multi-input logic gate. Thus, the transistor 193 becomes a series "and" gate for the base of the transistor 194 and, accordingly, determines when the relay coil 181 should be energized to close the contacts 180 and thereby disable the "linofilm" machine. Transistors 193 and 194 are of the PNP, switching type. The output of the emitter element of the transistor 193, which is operated as an emitter follower, is directly connected to the base of transistor 194, which is the error relay control transistor. Thus, the D.C. potential on the base of transistor 194 is the same as the emitter potential of transistor 193.

The collector element 196 of transistor 193 is connected to a negative logic "or" gate 207 having four parallel input lines 197, 198, 199 and 200 containing the diodes 203, 204, 205 and 206, respectively. The diodes 203, 204, 205 and 206 isolate the input lines 197, 198, 199 and 200 from each other to produce the "or" gate 207. That is, as long as a predetermined level of voltage is not exceeded in any one of the lines 197, 198, 199 and 200, the "or" gate 207 is in operation. In this particular embodiment the lines 197, 198, 199 and 200 are electrically connected to the output lines 210, 211, 212 and 213 in the "read" head circuit E (FIGURE 5). The lines 210, 211, 212 and 213 are in turn connected to the switches $S_{11}$, $S_{12}$, $S_{13}$ and $S_1$, respectively, through their corresponding trigger circuits 88. It will be noted that line 213 is connected to its corresponding trigger circuit through the lines 103 and 98.

Switches $S_1$, $S_{11}$, $S_{12}$ and $S_{13}$ are connected to existing tube circuits in the "linofilm" machine which are activated when a hole 22 appears in the tape 21 at stations 1, 11, 12 and 13, respectively (FIGURE 5). A hole 22 always appears in station 1 when the code row across the tape is indicating a function code, which code relates to one of point size, film advance, font change, normal word space and stop photography. In other words, if the tape has been properly punched when the coding operation is performed thereon, there must be a hole 22 at station 1 whenever a function code is provided in a row transverse of the tape. When a function code appears in a row on the tape, no character code appears in the same row. On the other hand, when a row of punched information contains a character code, then no function code appears in that row. However, the normal word space code is the only function code utilized in the control of the error circuit.

When a character or quad width code appears in a line of punched information, a punched hole 22 must appear in one of the stations 11, 12 and 13 (FIGURE 5). Accordingly, it follows from the foregoing that, every row of holes 22 along the tape 21 must have at least one punched hole in the station 1, 11, 12 or 13 or the tape has been improperly punched.

A font change code may appear in a line of characters. However, the scanning carriage stops, the vacuum is released and the error circuit is dropped out. The font is changed, the vacuum is restored so that the error circuit is again energized and characters are processed once more.

In this particular embodiment, the "or" gate 207 (FIGURE 5) is arranged to receive and respond to a relatively negative potential, by comparison with the positive 30 volt input at line 214, to hold the "and" gate (transistor 193) closed. More specifically, closing of any one or more of the switches $S_1$, $S_{11}$, $S_{12}$ and $S_{13}$ creates the presence of a relatively negative potential in its corresponding trigger circuit 88 at the base of the trigger transistor 89 (FIGURE 5). Since the transistor 89 is connected as an emitter follower, said negative potential appears in one or more of the output lines 210, 211, 212 and 213. The negative potential appearing in an output line from a trigger circuit 88 is relatively negative in respect to the positive potential of the emitter of transistor 193. Since the base of transistor 193 is also negative, the transistor can conduct from collector-to-emitter and provide a negative emitter output level.

As long as the negative potential appears in the collector circuit of the transistor 193 and, due to other functions performed by the error circuit I and discussed hereinafter, as long as the base of transistor 193 continues to be negative, the emitter circuit of transistor 193 impresses a negative bias upon transistor 194. Hence the transistor 194 will have a negative bias on its base which will oppose the negative input potential in line 219 which contains the closed relay terminals 192. However, if all of the switches $S_1$, $S_{11}$, $S_{12}$ and $S_{13}$ (FIGURE 5) remain open along any given line of tape content, then the collector circuit of transistor 193 will become positive and, accordingly, the emitter-follower configuration of transistor 193 will place a positive bias on the transistor 194 whereby said transistor will conduct positively through the emitter-collector circuit and thereby energize the relay coil 181 (FIGURE 13) which, accordingly, will close the relay terminals 180 and thereby disable the machine.

The lines 128, 148 and 142 (FIGURE 13), which are input lines to the "or" gate 222 of the error circuit I, are output lines from the temperature sensing circuit C (FIGURE 8), grid fault detection circuit F (FIGURE 10) and lamp fault detection circuit D (FIGURE 9), respectively. When said circuits C, F and D are functioning properly, the outputs therefrom are relatively negative by comparison with the positive input of 30 volts in line 214 of error circuit I. Accordingly, a negative bias appears at the base of transistor 193 whereby the emitter-follower configuration thereof impresses a negative bias upon the base of the transistor 194 which prevents a positive conduction through said transistor 194. The diodes 223, 224 and 225, in the lines 128, 148, 142, respectively, isolate these lines from each other and thereby create the "or" gate configuration.

If a failure is detected by the circuits C, F and D, the output voltage therefrom becomes positive and, accordingly, immediately places a positive bias on the base of the transistor 193. This immediately places a positive bias at the base of the transistor 194 whereby said transistor can conduct positively and energize the relay coil 181, as previously disclosed, to disable the "linofilm" machine.

The error circuit discriminates between single malfunctions and simultaneous malfunctions. That is, should a malfunction occur in both the 207 and 222 "or" gates, the error circuit will continue to be activated as long as both or one of the "or" gates detects a malfunction. Thus, all of the malfunctions must be rectified in their entirety in order to disable the error circuit.

The "linofilm" machine 20 (FIGURE 1), which has been selected to illustrate a preferred embodiment of the invention, has a companion keyboard unit which is well known and therefore not illustrated. They keyboard or perforating unit is arranged so that the width of a character is indicated upon the tape 21 in terms of units. Eighteen units of count by the counting mechanism of the keyboard unit corresponds to one em in any given point size for a character. The minimum width of any character is four unit parts of an em in the given point size and the maximum width of any character in a given point size is eighteen units or one em under normal counting procedure.

Since the width values for any character are established from four to eighteen units, the error circuit is capable of monitoring all perforated codes relating to width regardless of whether the width is fixed, quad space or a character width. Moreover, the error circuit I is capable of detecting erroneous width values which would produce copy incapable of use. According to present procedures, copy having such a width error must usually be redone.

In this particular photographic unit, the width values of characters are controlled by stations 11, 12, 13, 14 and 15. Station 15 initiates one unit of width, station 14 initiates two units of width, station 13 initiates four units, station 12 initiates eight units and station 11 initiates sixteen units. Thus, a binary relationship is set up by these stations. Since a valid character or quad width requires between four and eighteen units, at least one of the stations 11, 12 and 13 must have its switch closed whenever the tape content is indicating a character or quad width. By way of example, a nine unit character, which includes the width of the character and the adjacent space on one side of the character, requires closure of the switches at stations 12 and 15. If station 15 fails to close, only one unit of width is omitted so that the space between the character involved and the adjacent character is reduced by one unit which is either negligible or can be easily corrected. That is, the line of photographic copy can be cut between the two characters, if desired, and spread apart to add the missing one unit of width.

However, if a switch at station 12 fails to close, then the entire width is only one unit which is below the minimum width of four units. Accordingly, an error will be transmitted to the error circuit by virtue of the fact that at least one of the output lines from switches $S_{11}$, $S_{12}$ and $S_{13}$ will not be negative. It will be recalled that whenever character information is being provided by a line of tape content, at least one of the switches $S_1$, $S_{11}$, $S_{12}$ and $S_{13}$ must be closed to maintain the negative potential in the collector circuit of transistor 193.

The word space code is the only function code which can appear in the tape 21 after the precondition circuit is energized. Thus, the word space code is the only function code which, if not correct, can actuate the error circuit and disable the machine. The word space code effects a space of four units which is not controlled by the switches $S_{11}$ to $S_{15}$. Thus, switches $S_{11}$, $S_{12}$ and $S_{13}$ can remain open when the code for word space appears on the tape without actuating the error circuit I.

Thus, to summarize, a voltage appearing in the line 185 (FIGURE 13) from the film vacuum supply solenoid relay will close the relay contacts 192, thereby placing the circuit I in the ready or standby condition. As long as a relatively negative potential appears at the collector and base of the transistor 193, said transistor will inhibit a positive flow through the transistor 194. When a failure occurs in any of the portions of the "linofilm" machine monitored by the error circuit, a relatively positive output will appear in the collector of transistor 193, which will cut off current flow through same and thereby permit the transistor 194 to conduct. If a positive voltage appears in the base of the transistor 193, its emitter-follower configuration will also permit conduction in the transistor 194. In either case, the result is energization of the relay coil 181 whereby the relay contacts 180 are closed and the safety relay or circuit, which is an integral part of the "linofilm" machine, will be energized by the relay coil 182 to disable the machine.

The error indicator circuit J (FIGURE 14) is associated with and connected to the error circuit I (FIGURE 13.) That is, the relay contacts 230 (FIGURE 14) are oriented with the contacts 180 and 183, which are operated by the relay coil 181 (FIGURE 13). Accordingly, when the transistor 194 is forwardly biased, the relay coil 181 closes the relay contacts 230 in the relay circuit $I_R$.

The error indicator circuit J (FIGURE 14) provides both visual and oral indications when the error circuit I is energized. That is, whenever a negative voltage fails to occur at the "or" gate 207 (FIGURE 13) or whenever a positive voltage appears at the "or" gate 222, the contacts 230 (FIGURE 14) are closed by the relay coil 181, whereby the lamp 231 and the voice coil 232 are energized.

More specifically, the contacts 230 (FIGURE 14) are located in the input line 233 from the negative supply to the indicator circuit. Thus, when the contacts 230 are opened, no collector voltage is supplied to the transistors 235 and 236. Said transistors 235 and 236 are connected to provide a free-running or a stable multivibrator circuit 237, which is activated by closing said contacts 230. Said multivibrator circuit 237 oscillates at a rate determined by the value of the resistance 238 and capacitance 239, which control the rate of discharge through the transistor 235, and the values of the resistance 242 and capacitance 243, which control the rate of discharge through the transistor 236. Accordingly, first one and then the other of the collectors in the transistors 235 and 236 will become more positive in respect to the minimum 30 volts in line 233. Thus, first one and then the other of said transistors will first conduct and then cut off, alternatively.

As first one and then the other transistor conducts and cuts off, the capacitor 244 will be charged first negatively and then positively by said multivibrator circuit 237, whereby current is caused to flow through the lamp 231 and high voltage side of the transformer 246 first in one direction and then the other. Accordingly, the lamp 231 is caused to flicker and the field of the transformer 246 is caused to build up and collapse in an expected manner, whereby the voice coil 232 is intermittently energized from the low side of the transformer 246.

More specifically, it will be assumed that transistor 235 is the first of the two transistors to conduct in its collector-to-emitter circuit, due to the discharge of the capacitor 239. As a result of current flow through transistor 235, the colletcor voltage in transistor 235 becomes positive with respect to the collector voltage of transistor 236. Accordingly, capacitor 244 is charged to the instantaneous value of the collector voltage of 236 minus the collector voltage of 235. The collector voltage of 236 cuts off transistor 235 so that the collector voltage of transistor 235 approaches the supply voltage which, in this instance, is negative 30 volts. The capacitor 244 now discharges through the parallel circuit including the lamp 231 and transformer 246 as the polarity of said capacitor 244 changes and energizes said lamp and said transformer. Accordingly, as discussed above, the lamp 231 is momentarily energized and ignited, and the corresponding flow of primary current through the transformer 246 induces a secondary current flow in the transformer 246 which momentarily energizes the voice coil 232 to produce an audible vibration therein. The frequency of the reversal of the multivibrator circuit 237, hence of the pulse through the lamp 231 and transformer 246, is a function of the control time constant, which is dependent upon the values of the resistances 238 and 242 and the capacitances 239 and 243.

*Lamp panel*

FIGURE 3 illustrates a portable panel 250 upon which the various indicator lamps, many of which were described above, are preferably mounted for visual observation. The panel 250 is preferably mounted upon an exterior surface of the cabinet 25 (FIGURE 1) housing and "linofilm" machine 20. Accordingly, there are 22 lamps circuits described above are actually disposed upon the outer surface of the panel 250.

As indicated in FIGURE 2, several of the component circuits described above are duplicated in the control apparatus 60. For example, 22 pulse converter and trigger circuits $A_1$ (FIGURE 6) are contained and utilized by the control apparatus 60 for the purpose of monitoring an equal number of primary operations performed by the "linofilm" machine 20. Accordingly, there are 22 lamps 75 on the panel 250, each of which is connected to a substantially identical pulse converter circuit $A_1$ (FIGURE 6). Each of the lamps appearing in FIGURE 3 will be separately identified by the letter "L" plus a suffix numeral and such lamp identification will be related with the lamp reference number appearing in the type of circuit associated with this lamp for the monitoring function. Furthermore, and to orient the lamps appearing in FIGURE 3 with the function which they perform, the same lamp identification appears in FIGURE 4, which diagrammatically disposes the various parts in said "linofilm" machine which are being monitored in this particular embodiment of the invention and for illustrative purposes.

Figure 4:
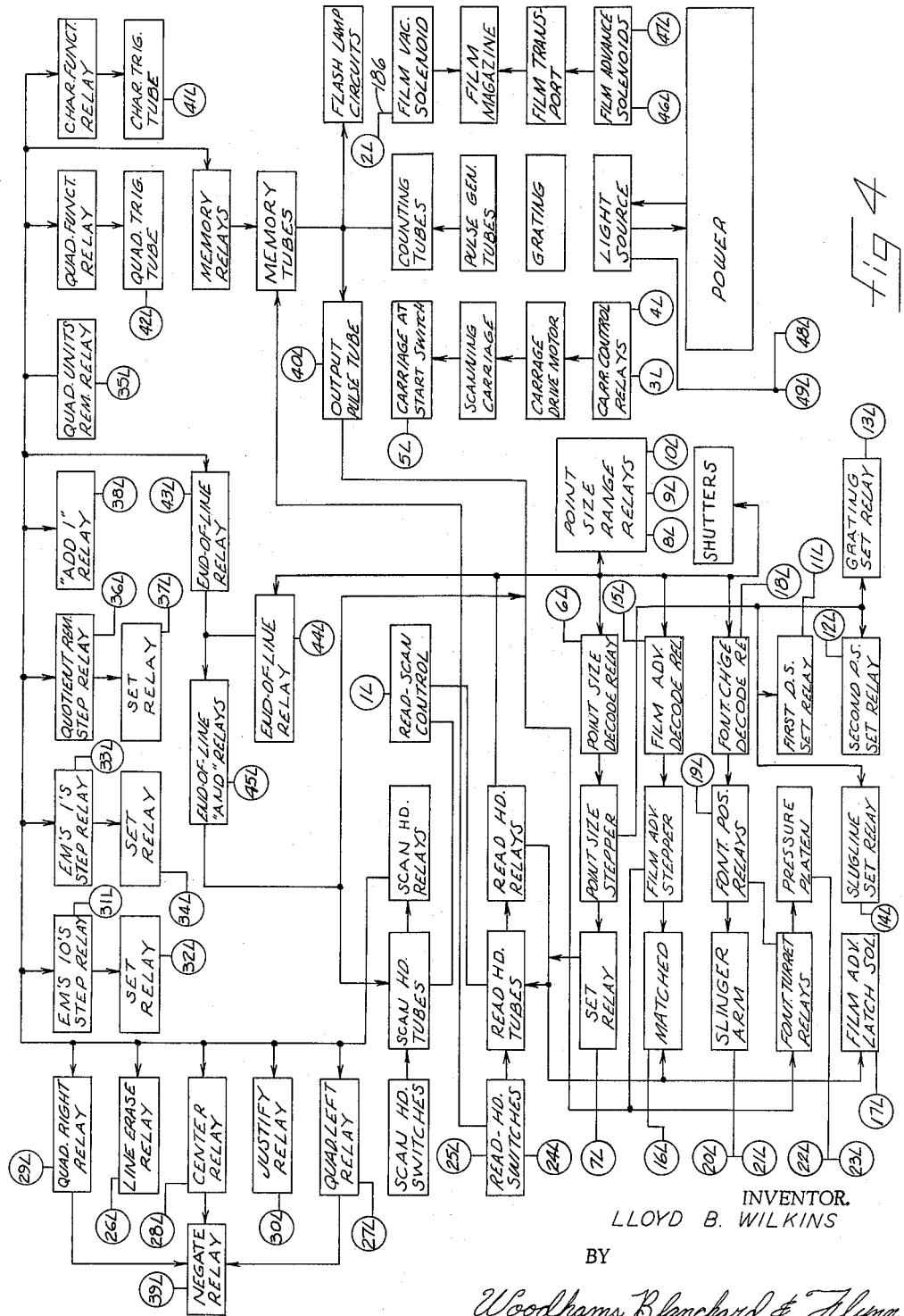
FIGURE 4 is a block diagram of the photocomposition machine which has been selected to illustrate the invention, said diagram showing the points in said machine at which energy is tapped to operate a light on said light panel.

The particular lamp identification is clearly shown in FIGURES 2, 3 and 4 in association with the type of monitor circuit, with the monitored function and with the location of the corresponding lamp on the panel 250, respectively. Thus, a detailed recitation of the physical relationship of each lamp with its circuit or monitored function is believed to be unnecessary. Instead, the manner in which said lamps are lighted and/or extinguished on the panel 250 during the normal functioning of the "linofilm" machine will be described and, it is believed, that the relationship between said lamps and the monitored functions or circuits will become sufficiently apparent from this functional description. In order to conserve space, the lamp designations will be shown in a circle and without the "L" in FIGURES 3 and 4.

FIGURE 3 discloses a panel 250, which is specifically designed for use with a "linofilm" machine 20 (FIGURE 1). Lamp L1 is a lamp 75 FIGURE 6) in an $A_1$ circuit, having its input line 66 connected to the output from the timing device, such as the master oscillator, in the "linofilm" machine. Thus, lamp L1 is energized when the master oscillator is released, as by the closure of an electronic switch. The circuit $A_1$ (FIGURE 2), which includes lamp L1 (FIGURE 4) is connected to the read scan control, which includes the master oscillator.

The lamp L3 (FIGURE 3) is in an $A_1$ circuit (FIGURE 2) which is connected to and energized by the scanning motor 47 (FIGURE 1) when it is moving the scanning carriage 46 toward the start position. Lamp L3 is extinguished when the start position is reached. Thus, failure of lamp L3 to light means that said carriage is at the start position.

Lamp L5 (FIGURE 3) is in an $A_1$ circuit which is energized when the carriage 46 (FIGURE 1) reaches the starting position at the beginning of a line and, therefore, as the lamp L3 is extinguished.

Lamp L6 (FIGURE 3), which is the same as the lamp 108 (FIGURE 7) in the B circuit, is lighted when the switches $S_1$ and $S_3$ (FIGURE 5) are closed. However, the lamps L25–1 and L25–3 (FIGURE 3) are lighted before lamp L6 is lighted, because the lamps L25–1 through L25–15 represent each of the fifteen switches $S_1$ through $S_{15}$ (FIGURE 5) and are electrically and immediately responsive to closure of such switches. Lamps L25–7, L25–8, L25–9 and L25–10 are connected to the switches $S_7$, $S_8$, $S_9$ and $S_{10}$, respectively, (FIGURE 5) and, therefore, are controlled directly by said switches. Accordingly, when the lights L25–1 and L25–3 are lighted, one of the lights L25–7 through L25–10 can also be expected to be lighted.

The lamp L7 (FIGURE 3) is part of an $A_1$ circuit which is energized by an impulse from the "set" relay (FIGURE 4) of the memory relays in the "linofilm" machine. Thus, lighting of lamp L7 indicates that the specific point size has been stored in said memory relays. The point size is coded in the first row of stations or perforations crosswise of the tape for any given line of characters coded thereon. Energization of the set relay in the "linofilm" machine, which energizes the "set" lamp L7, causes the "read" head 24 (FIGURE 1) to move the tape 21 therethrough to the next row of code across the tape. At this instant, one of the range lamps L8, L9 and L10 (FIGURE 3) is lighted to indicate the range of point size being used. The range lamps L8, L9 and L10 correspond to the lamps 157, 158 and 159, respectively, in circuit G (FIGURE 11). The appropriate range lamp, which is lighted, will remain lighted until the last character in the particular line of characters being photographed has been completed.

The first and second point size lens lamps L11 and L12 (FIGURE 3) are in $A_1$ circuits (FIGURE 2), which are energized when the point size information is stored in the memory relays. When the first and second point size lenses 38 and 39 (FIGURE 1) have been focused in accordance with the point size information stored in the memory relays of the "linofilm" machine, the L11 and L12 lamps are extinguished.

While the first and second point size lenses 38 and 39 (FIGURE 1) are being focused, the pulse grating 52 is being moved, if necessary, in a vertical direction to position the proper row of grating or slits between the light source 53 and photocells 54, whereby pulses are counted. The grating lamp L13 (FIGURE 3), which is in an $A_1$ circuit, is lighted by the grating "set" relay (FIGURE 4) of the "linofilm" machine which calls for a particular row of grating. The lamp L13 is extinguished when the grating has been moved so that the proper row of slits is in position.

The slug line lamp L14 (FIGURE 3), which is in an $A_3$ circuit, is lighted when the slug line set relay (FIGURE 4) of the "linofilm" machine has received the information relating to the amount of space between the preceding line of type, if any, and the line of type about to be photographed on the film. The slug line lamp L14 is extinguished as soon as the proper spacing is set by the slug line motor or film transport drive 57.

When the second row of punches is moved into position beneath the "read" head 24 (FIGURES 1 and 5), the film advance lamp 15 (FIGURE 3), which is in a B circuit (FIGURES 2 and 7), should be immediately lighted to indicate that there are punches at stations 1 and 4 in the second row of code across the tape, whereby the switches $S_1$ and $S_4$ have been closed. At the same time, or slightly before the lamp L15 is ignited, the lights L25–1 and L25–4 (FIGURE 3) are lighted by the closure of the switches $S_1$ and $S_4$ and the lighting of lamp L15 follows thereafter.

With the film advance code on the tape 21 (FIGURE 1) under the "read" head 24, the lamps L25–5 through L25–10 indicate specific film advance codes. It will be recalled that lamps L25–7 to L25–10 indicated specific point size when the "read" head was over the first row of code on the tape. The lamps L25–5 to L25–10 represent, in binary fashion, a total of 63 points of film advance in reverse order from L25–10 to L25–5. In this particular "linofilm" machine 20 (FIGURE 1), the maximum amount of film advance used is 48 points. "Film advance" is an established term which refers to the movement of the film within the machine from one line of characters being photographed to the next line of characters.

The "matched" lamp L16 (FIGURE 3), which is in an $A_1$ circuit (FIGURES 2 and 6), is lighted to indicate that film advance step relays of the "linofilm" machine are in the process of matching the coded film advance in the tape with the actual position of the film advance transport mechanism 57 (FIGURE 1). When the code matches the position of the film advance transport mechanism, the lamp L16 will be extinguished.

The film advance "latch" lamp L117 (FIGURE 3), which is an $A_3$ circuit (FIGURES 2 and 6B), is lighted to indicate that the film advance motor switch and detenting mechanism (not shown) of the "linofilm" machine is open to permit the setting of the film advance transport mechanism 57 (FIGURE 1). The lamp L17 is extinguished when film advance transport mechanism is set, hence right after the matched lamp L16 is extinguished. The relays in the "linofilm" machine cause the tape 21 to be moved with respect to the "read" head 24 to the next row of code, as soon as the film advance has been set, so that said tape movement is indicated by the extinguishing of lamps L16 and L17.

Up to this point in the functional description of the lamp panel 250 (FIGURE 3), attention has been directed to those lamps which are lighted and/or extinguished as the result of functions monitored thereby relating to information being fed to the "linofilm" machine through the "read" head 24. However, as stated previously, the portion of the tape 21 which passed through the "read" head to produce the signals and impulses monitored as discussed in the foregoing paragraphs, previously passed through the "scan" head 26 without effecting any operation of the machine.

However, while the "linofilm" machine was responding to the point size code detected by the "read" head in the first row on the tape, a substantial portion of the tape following said first row moved through the "scan" head and arrived at the "end-of-line" (EOL) code on the tape for the second line of character content to be produced by the machine on the film. The "scan" head had previously decoded and stored all of the answer information and end-of-line information for the first line before the "read" head even moved onto the first row of coded material on the tape. The answer information and end-of-line information, which is understood in the art, pertains to the placement of the characters to be exposed, pursuant to instructions from the decoding by the "read" head, and the amount of counting or pulsing which has to be performed by the machine before the photographing of a line of type is commenced on the film. Since the "scan" head has now arrived at the end-of-line information at the end of the second line, a discussion of the particular action which occurs as the result of the functioning of the "scan" head in decoding the end-of-line codes will now be explained.

It will be assumed that the first line of character codes, which are about to go under the "read" head, was set up for a "quad-right" positioning. As is well known, this means that the last exposed character in the first line of characters will be flush with the right-hand margin of the copy being photographed, and that all letters in the first line will then be uniformly and properly spaced leftwardly from the right-hand margin. The location of the first character in the firstline is determined by the machine which computes the total width of all the characters and spaces in the first line prior to the photographing of the first character of the first line. In other words, the carriage will move along the film until it reaches a point where the first character in the line must be photographed if the last character in the line is to be flush with the right-hand margin.

Since the code in the end-of-line information at the end of the first line has indicated a quad-right line, the quad-right lamp L29 (FIGURE 3), which is in an $A_5$ circuit (FIGURES 2 and 6D), will be lighted. It will be assumed, for illustration, that four ems of space must be provided at the beginning of the line before the first character is photographed on the film, in order to provide the quad-right location of the line. The quad-right lamp L29 is lighted only momentarily and is extinguished as soon as the "scan" head 26 is moved from said end-of-line code and scans in search of the next EOL code. That is, the scan head moves to the second line, end-of-line code as soon as it has decoded and stored the end-of-line information for the first lines. At the same instant that the quad right lamp was lighted, the quad function relays are "set" to the proper answer (in this case, 4 ems). That is, the ems ones lamp will be pulsed rapidly and when set at 4 on the relay, the "set" lamp will come on. When the first time is processed by the "read" head, the ems ones lamp will be pulsed 4 times, before any characters are placed.

In addition to the quad-right lamp L29, there are five quad-function lamps L31, L32, L33, L34 and L35 (FIGURE 3). The ems ones lamp L33, which is in an $A_2$ circuit (FIGURE 2), is rapidly pulsed (approximately 60 steps per second) while the quad-right lamp L29 is lighted and until the proper amount of ems corresponding to the amount of space at the beginning of the particular line of type has been selected in the storage relay of the machine, which indicates that the amount of space is being set into the step relays of the machine which control the initial movement of the carriage before the film is exposed by the first character in the line. When such rapid pulsing is completed and the step relay is therefore set the ems ones "set" lamp L34 (FIGURE 3), which is in an $A_1$ circuit (FIGURE 2), is lighted, which indicates that a step relay (not shown) in the "linofilm" machine has been properly set to correspond to the amount of ems which have been coded in the end-of-line answer information.

The description in the immediately foregoing paragraph concerns that which occurred when the "scan" head reached the end of the first line. However, as previously stated, the "scan" head 26 (FIGURE 1) moves to the beginning of the scond line of coded information before the "read" head 24 even begins to respond to the punches representing the first line of coded information on the tape. Also, the "scan" head 26 moves along the second line of coded data on the tap while the "read" head is decoding just the first row of code in the first line of information on the tape. Accordingly, the "scan" lamp L43 (FIGURE 3), which is in an $H_1$ circuit (FIGURES 2 and 12), is lighted when the "scan" head reaches the end-of-line code at the end of the second line.

While the "scan" head 26 rests on the end-of-line code for the second line of coded information, pursuant to the normal functioning of the "linofilm" machine, the "read" head 24 now proceeds to decode the character content from the first line of coding on the tape 21 and convert such coding into characters on the first line of the film. At this point, the rack down lamp L47 (FIGURE 3), which is in an $A_1$ circuit (FIGURE 2) is lighted to indicate that the film transport rack drive 57 is disengaged and the machine is now ready for the processing of characters on the film.

At about this time, the front decoded lamp L18 (FIGURE 3), which is in a B circuit (FIGURE 2), is lighted to indicate that the required grid or font code, which is provided by the third row of punches in the tape 21, has appeared under the switches of the "read" head 24. One or more of the font position lamps L19–1 through L19–5 (FIGURE 3) are lighted at the same time that the font decoded lamp L18 is ignited. The lamps L19–1 through L19–5, which are in $A_1$ circuits (FIGURE 2), correspond to binary functions 1, 2, 4, 8 and 16, respectively, and identify by their lighting which one of the eighteen grids 34 (FIGURE 1) is to be removed from the grid holder 33. The lamps L25–1, L25–3 and L25–4 will normally be lighted slightly before the lamp L18, because they indicate that the code switches $S_1$, $S_3$ and $S_4$ have been closed by the perforations in the third row of the first line of coded information of the tape, which is the font code row, and also that the third and final preconditioning function has taken place.

Since the "read" head is now over the third row of punches in the tape 21, the lamps L25–6 through L25–10 (FIGURE 3) now indicate the specific font code and they are controlled by the switches $S_6$ through $S_{10}$, respectively, in the "read" head. These lamps indicate, in binary fashion, the position of the desired grid in the grid storage, just as the lamps L19–1 through L19–5 have indicated the selected grid. However, the lamps L25–6 through L25–10 indicate that this information has been stored in the machine. The appropriate lamps L25 will be lighted to indicate the exact position of the grid in the grid storage, which will be used for the first line of photographed characters.

The first line of characters, as explained previously, is quad-right. Accordingly, the forward "scan" lamp L4 (FIGURE 3), which is in an $A_1$ circuit (FIGURE 2), will be lighted to indicate that the scanning carriage motor 47 (FIGURE 1) is moving the carriage 46 in a forward direction. At the same time, the film vacuum lamp L2 (FIGURE 3), which is also in an $A_1$ circuit (FIGURE 2), is lighted to indicate that the vacuum pressure has been applied to the film to keep it flat against the platen in the film magazine. At the instant that the lamps L4 and L2 are ignited, the lamp L5 (carriage at start of line) (FIGURE 3) will be extinguished to indicate that the carriage has moved away from its start position.

The moment that the scanning carriage 46 (FIGURE 1) begins to move from its start position, the pulse generating grating 52 begins to produce pulses, which cause the counting circuits (not shown) of the "linofilm" machine 20 to operate the stepping relays therein, which have been preset with information taken from the tape by the "scan" head. It follows, therefore, that the ems ones pulsing lamp L33 will be pulsed four times indicating that the four ems of space is being counted before the first character in the first line is photographed on the film. At the beginning of the pulsing period, the ems ones set lamp L34 will be extinguished. While the ems ones lamp L33 is being pulsed, the gating tube quads lamp L42 (FIGURE 3), which is in an $A_7$ circuit (FIGURES 2 and 6F), will also be pulsed to indicate that the required quad information is being counted by the counting circuits of the "linofilm" machine.

After the required four ems (of the first line quad-right spacing) has been counted, the forward "scan" lamp L4 and film vacuum L2 (FIGURE 3) will be extinguished and the scanning carriage 46 (FIGURE 1) will be stopped for the grid change. The grid information on the tape 21 has been previously decoded and set into the appropriate memory relay of the "linofilm" machine. Accordingly, and by appropriate operation of the "linofilm" machine 20, the grid change cycle will be performed and completed at this time. That is, the grid transport device 33 will move downwardly toward the grid rack 36, engage a grid 34 and raise it into position adjacent the pressure plate 35 and in alignment with the shutter assembly 32.

The transport arm "up" lamp L20 (FIGURE 3) and transport arm "down" lamp L21, which are both in $A_1$ circuits (FIGURE 2), indicate the position of the grid transport arm or device at all times. Normally the transport arm 33 (FIGURE 1) is in the "up" position holding a grid 34 between the pressure plate 35 and the shutter assembly 32. The circuits of the lamps L20 and L21 are energized by switch means responsive to the movement of the transport arm 33.

The grid change cycle commences by movement of the pressure plate 35 (FIGURE 1) away from the shutter assembly 32. This permits the transport arm 33 to move the grid 34 downwardly and place it in its vacant position in the grid rack 36, which causes the transport arm "down" lamp L21 to be lighted. When the "down" light L21 is lighted, the transport arm 33 is out of a position of interference with the grid rack 36 so that said rack can rotate, if necessary, around its central axis to position the desired grid where it can be engaged by the transport arm 33. Obviously, if the grid that was previously in the operating position is to be used again, the grid rack 36 will not be moved.

As soon as the rack 36 (FIGURE 1) arrives in proper position for removal therefrom of the desired grid, the rack is locked in position to prevent further movement thereof. At the same moment, the "read" head steps to the next row of punches in the tape 21, which is the fourth row in this particular embodiment. The lamps L25 (FIGURE 3) will now light up in response to the character and width codes appearing in the fourth row on the tape. The grid transport arm 33 will move the selected grid into poistion between the pressure plate 35 and the shutter assembly 32 and, while doing so, will cause the "down" light L21 to be extinguished and the "up" light L20 to be ignited. The pressure plate 35 then locks the grid in the proper photographic position.

The forward "scan" lamp L4 and film vacuum lamp L2 (FIGURE 1) will again be lighted to indicate that the scanning carriage motor is once more moving the carriage in the forward direction. Hence, the relighting of these lamps also indicates that the machine is now starting to photograph the characters on the film according to instructions from the tape 21 in row 4 and the following rows on the tape until the line of characters is completed.

The error indicator lamp L24, which is the same as lamp 231 (FIGURE 14) in the J circuit, is normally extinguished. However, if the width value of the character information on the tape under the "read" head at any instant is lacking, or if the total binary width value of the coded character is less than the minimum width of four em ones unit parts of an em, the error lamp L24 will be pulsed and will continue to flash until the error is corrected or until the error indicator circuit J is disabled. The "linofilm" machine 20 (FIGURE 1) will be disabled by the error circuit I (FIGURE 13) so that it will be unable to process any further codes on the tape 21 until the width (or lack of a character code) error has been corrected.

If the grid transport arm fails to place a grid in position adjacent the pressure plate 35 (FIGURE 1), the error light L24 will be lighted and the error circuit I will disable the operation of the machine. However, if the grid is being properly engaged by the pressure plate 35, then the grid normal light L22 (FIGURE 3), which is in an F circuit (FIGURES 2 and 10), will remain lighted. Should the transport arm 33 fail to engage or place the grid properly, so that the grid normal lamp L22 is not lighted, then the grid reject lamp L23 (FIGURE 3), which is also in an F circuit (FIGURE 2), is lighted.

If all of the required width information is present on the coded tape at the particular row or station being read by the "read" head, the scan carriage will continue to move forward and, as indicated previously, the tape 21 (FIGURE 1) will move through the "read" head and cause the "linofilm" machine 20 to operate in a normal manner. That is, the pulse generator will count off the indicated width value of the first character after which the counting circuit will trigger the flashlamp 28 and thereby expose the film with the character on the grid in line with the light beam 37 from said flashlamp.

While the pulse generator or grating 52 (FIGURE 1) is counting off the width value of the first character, the gating tube lamp L40 (FIGURE 3), which is in an $A_8$ circuit (FIGURES 2 and 6F), will have been pulsed to indicate the counting pulses processed by the counting circuit. At the same time that the character width pulses are counted and visually indicated by the gating tube lamp L40, the gating tube character lamp L41 (FIGURE 3), which is in an $A_8$ circuit (FIGURE 2), will be pulsed or ignited once and then extinguished to indicate that all of the required pulsing has been accomplished for the first character. The pulse of the gating tube provides the necessary output to perpetuate the character processing operation, hence the initiation of the tape movement to the next row.

The width of the second character, controlled by the code in the fifth row on the tape 21, is displayed once more by the "read" head tape content lights L25 (FIGURE 3) and particularly by the lights L25–3 through L25–15, which represent all of the various combinations of common or character and width codes. The scanning carriage moves forwardly, pursuant to the counting of the pulse generator in response to the width value of the second character. This process is repeated for each character and each word space until the last character code in the first line of character codes on the tape 21 has passed beneath the "read" head and, therefore, when the end-of-line code is disposed beneath the "read" head.

The end-of-line code for any given line is detected by both the "scan" head and the "read" head and effects an appropriate operation thereof. Specifically, the "read" head, which has just completed the processing of the character content coded on the tape for the first line of code, is now resting at the end of this line code and, accordingly, the "read" head lamp L44 (FIGURE 3) will be ignited to indicate this condition. Lamp L44 is in an $A_6$ circuit (FIGURE 2).

During the aforementioned processing conducted by the "read" head, the "scan" head has been resting on the end-of-line code for the second line of type to be processed. The end-of-line "scan" head lamp L43 (FIGURE 3) will be ignited to indicate this condition. When the "read" head and "scan" heads are on end-of-line codes, the "and" lamp L45 (FIGURE 3) will be ignited to indicate that the "read" head has completed its processing of the first line of copy and that the end-of-line code for the second line of copy has been stored by the "scan" head and that the answer for the location of the second line on the film has been computed and stored. Lamp L45 is in an $A_4$ circuit (FIGURES 2 and 6C).

Relay action in the "linofilm" machine steps the tape 21 through the "read" head from the end of the first line to the beginning of the second line of copy and steps the tape through the "scan" head to the beginning of the third line of coded copy on the tape. As in the previous lines, the tape immediately moves through the "scan" head to the end of the character codes in the third line and stops in position ready to read the end-of-line codes for the third line of copy. The "read" head moves onto the first row of code for the second line of copy and commences to decode and set the memory or stepping relays of the machine with the primary function codes appearing in the second line of code ahead of the character codes.

During the instant that the "and" lamp L45 is ignited, the film advance drive 56 (FIGURE 1) is actuated to advance the film 50 to the next line on the film according to the film advance information stored in the machine relays. The rack down lamp L47 (FIGURE 3) will be extinguished and the the rack up lamp L46, which is in $A_1$ circuit (FIGURE 2), will be ignited.

During the time that the "read" head is moving from the end of the first line to the beginning of the second line of coded copy, the scanning carriage is moving back to its start-of-line position. Accordingly, the forward scan lamp L4 (FIGURE 3) and film vacuum lamp L2 will be extinguished and the carriage reverse lamp L3 will be ignited. When the carriage reaches the starting position thereof, the carriage at-start-of-line lamp L5 will come on and the carriage reverse light L3 will be extinguished. From this point the previously outlined sequencing operation with respect to the "read" head will be repeated, and the sequencing performed by the functioning of the "read" head will take place substantially as set forth above.

In explaining the operation of the machine 20 and the monitoring of such operation by the lamps on the panel 250, it was assumed that the code on the tape 21 called for a quad-right copy. However, under some circumstances, the end-of-line code for any given line of copy coded on the tape may call for a different type of copy arrangement. That is, the end-of-line code may call for a quad-left, in which case the quad-left lamp L27 (FIGURE 3), which is in an $A_5$ circuit (FIGURE 2), will be ignited instead of the quad-right lamp L29. In such case, each line of the copy will start flush with the left-hand margin on the film.

The center lamp L28 (FIGURE 3), which is in an $A_5$ circuit (FIGURE 2), will be ignited if the end-of-line code calls for a centering of the copy on the film. The justify lamp L30, which is in an $A_4$ circuit (FIGURE 2), will be ignited if the end-of-line code calls for a line of copy which must extend from the left-hand margin to the right-hand margin thereof. The line-erase lamp L26, which is in an $A_4$ circuit (FIGURE 2), will be ignited when the end-of-line code indicates that the line of copy preceding such end-of-line code calls for the deletion of such line. In this case, all of the coded information in the line preceding the line-erase code will be treated by the "read" head as though such line did not appear on the tape.

Certain additonal functions of the "linofilm" machine operation, which have not been discussed in the foregoing disclosure of the panel construction and of the machine operation, are monitored by appropriate lamps on the panel 250 and will now be described. Whenever there is a punched hole in any one of the stations 11 through 15 (FIGURE 3), and the "read" head is resting on the end-of-line code, the appropriate lamp L25–11 through L25–15 is ignited and, at the same time, the quad units remainder lamp L35 is ignited. The ignition of the lamp L35, which is in an $A_2$ circuit (FIGURE 2), indicates that the quad units answer portion of the end-of-line codes has been stored.

The quotient remainder lamp L36 (FIGURE 3), which is in an $A_2$ circuit (FIGURE 2), is pulsed or ignited for each word space code that appears in a line of code which is "justified," "quad-left" or "quad-right." The step lamp L37, which is in an $A_1$ circuit (FIGURE 2), is ignited to indicate that the quotient remainder step relay in the "linofilm" machine has been set to step off the word spaces whenever they are called for by the character content code.

The expanded lamp L38 (FIGURE 2), which is in an

A₁ circuit (FIGURE 2), is ignited whenever a code appears in stations 6 through 10 in a row of the end-of-line code, which code is calling for a justified or quad line. In the case of a justified line, the expand lamp L38 will come on for the period required to indicate that the word spaces are being expanded by one unit part of an em. The lamp L38 will be extinguished when the expansion is completed.

The gate lamp L39 (FIGURE 3), which is in an H₂ circuit (FIGURE 2), is ignited for all center and quad-right lines. This indicates that the normal word spacing of from four to twelve units of width is being set between words and that the word spacing is not being altered, even if the expand lamp L38 is ignited.

The grating illuminate lamp L48 (FIGURE 3), which is in a D circuit (FIGURES 2 and 9), is illuminated whenever the pulse generator light source 53 (FIGURE 1) is energized, and L48 stays on as long as such light source is operating properly. The filaments lamp L49, which is in a D circuit (FIGURE 2), operates in conjunction with the grating illuminant or pulse generator light source. Since the light source 53 receives its operating potential from the same source which energizes the vacuum tube heater transformers in the machine, extinguishing of lamp L49 indicates that there is no filament or heater voltage in the machine.

The D.C. voltage meter 255 (FIGURE 3) indicates the direct current voltage level of the machine 20, which voltage level is regulated by the machine and, upon failure might render the machine inoperative. The meter 123 (FIGURE 3) is the same meter shown in the temperature sensing cicruit C of FIGURE 8. This meter converts the internal cabinet temperature into D.C. milliamperes for the purpose of detecting an abnormal rise of temperature within said cabinet, which rise would be detrimental to the normal operation of the machine. The face of meter 123 is marked at points thereon to indicate the areas of normal and abnormal temperatures. The elapsed time meter 256 indicates the total running time of the machine which is useful in conducting preventive maintenance. That is, components can be changed after predetermined periods of operation and thereby avoid costly breakdowns thereof resulting from fair wear. The test jacks 257 and 258 (FIGURE 3) are provided for checking the two critical power supplies within the machine.

Although paritcular preferred embodiments of the invention have been disclosed in detail above for illustrative purposes, it will be recognized that variations or modifications of such disclosure, which come within the scope of the appended claims, are fully contemplated.

What is claimed is:

1. In a photocomposition machine for performing predetermined functions in response to actuation of a sensing device by a precoded tape, a control device for monitoring the performance of said machine and indicating the state thereof, comprising:
   a plurality of electrically operated indicators mounted in a group near said machine;
   a plurality of electrical impulse circuits for connecting each of said indicators to a selected element of the machine so that said indicators are electrically energized in a predetermined pattern when their corresponding elements function in a predetermined manner;
   a plurality of code sensing devices arranged on the machine for actuation by said tape;
   a shutoff means for disabling said machine;
   first switch means;
   gate means connected in series between a plurality of said electrical impulse circuits and said first switch means, said first switch means being operated in response to operation of said gate means; and
   second switch means connected in series between said shutoff means and a source of electrical energy, said second switch means being operated in response to operation of said gate means and said first switch means, whereby said shutoff means is operated.

2. In a photocomposition machine for exposing predetermined indicia upon a sensitized film in response to actuation of a sensing device by a precoded tape, a control device for monitoring the operation of said machine and indicating the state of such operation, comprising:
   a plurality of lamps mounted in a group near said machine and a source of electrical energy therefor;
   a plurality of electrically operated circuits connecting each of said lamps to a selected element of the machine, said lamps being energized from said source in a predetermined pattern when their corresponding elements function in a predetermined manner;
   a tape reading head on the machines, said head having a plurality of sensing devices arranged for actuation by the code on said tape;
   a shutoff switch for disabling said machine;
   a first switch means;
   a plurality of "or" gates connected in series between said electrically operated circuits and said first switch means, said first switch means being operated in response to operation of said "or" gate means; and
   second switch means connected in series between said shutoff switch and said source of electrical energy, said second switch means being operated in response to operation of one of said "or" gates and said first switch means whereby said shutoff switch is operated.

3. In a photocomposition machine for exposing predetermining indicia on a sensitized film in response to actuation of a sensing mechanism by a precoded tape, an apparatus for monitoring and controlling the operation of said machine and indicating the state of such operation, comprising:
   a plurality of lamps mounted in a visible group on said machine;
   source means of electrical energy;
   a plurality of electrically operated, impulse circuits connecting each of said lamps to said source means and to a selected element of the machine, said lamps being energized from said source means in a predetermined pattern when their corresponding elements function in a predetermined manner;
   a tape reading head on the machine, said head having a plurality of sensing switches arranged for actuation by the code on said tape;
   a shutoff switch for stopping the normal operation of said machine;
   an "and" gate switch means;
   a first "or" gate connected in series between a first group of said electrically operated circuits and said "and" gate switch means;
   a second "or" gate connected in series between a second group of said electrically operated circuits and said "and" gate switch means;
   first switch means connected to said "and" gate and responsive to an operation of one of said "or" gates and said "and" gate; and
   second switch means connected in series with said first switch means and said source means, said second switch means being operated in response to operation of said first switch means, whereby said shutoff switch is operated.

4. An apparatus according to claim 3 wherein said photocomposition machine includes a vacuum pressure circuit; and
   wherein one of said impulse circuits is energized by said vacuum circuit, operation of said second switch means being dependent upon energization of said one impulse circuit.

5. An apparatus according to claim 3 wherein selected ones of said sensing switches are each connected in series through a said electrically operated impulse circuit to one of said "or" gates;

wherein selected ones of said electrically operated impulse circuits are connected to the other "or" gate, said "and" gate being disabled as long as the input from both of said "or" gates remains relatively negative to said source means.

6. An apparatus according to claim 3 wherein each one of a substantial number of said impulse circuits includes a light source electrically connected to said source means in response to operation of its corresponding element, and a light sensitive resistance responsive to variations in the intensity of said light source, said resistance being in series with one of said lamps and said source means.

7. An apparatus according to claim 3 wherein selected ones of said sensing switches are connected in a plurality of different combinations and in series with one of said impulse circuits and a plurality of "and" gates, each "and" gate being connected in turn to one of said lamps, whereby the operation of selected combinations of said sensing switches will be visually indicated.

8. The apparatus of claim 3 wherein one of said impulse circuits includes a pair of heat sensitive resistances connected between said source means and the second "or" gate, whereby a relatively positive pulse will be developed in said "or" gate when the temperature one of said resistances exceeds a selected temperature, thereby stopping said machine.

9. An apparatus according to claim 3 wherein said machine has a continuously operating first light source;
wherein one of said impulse circuits includes a first light sensitive resistance responsive to changes in the intensity of said first light source, said resistance being connected in series between said source means of electrical energy and ground;
a second light source connected in parallel with said first light sensitive resistance;
a second light sensitive resistance responsive to changes in the intensity of said second light source, said second light source and said second light sensitive resistance being molded in a single capsule of an epoxy resin, and said second light sensitive resistance being connected to said second "or" gate, whereby failure of said first light source energizes said second light source and thereby creates a positive potential in said second "or" gate to stop said machine.

10. An apparatus according to claim 3 wherein said machine includes a grid holding device having a single pole, double-throw switch movable in response to the presence and the absence of a grid in said grid holding device, said switch having a grounded armature;
wherein one of said lamps and one pole of said switch are connected in series with said source means, and the other pole of said switch and another lamp are connected in series with said source means, said one of said poles being connected to said second "or" gate, said armature being normally urged into electrical engagement with said one pole and held in engagement with said other pole by said grid, whereby a positive potential will appear in said second "or" gate when a said grid is not in said grid holder.

11. An apparatus according to claim 3 wherein one of said impulse circuits includes first, second and third transistors having their emitter-collector circuits each connected in series with a lamp and in parallel between ground and a positive potential;
first and second transducers consisting of a light sensitive resistance connected in series between said positive potential and the base of said first and second transistors, and a source of illumination connected between said electrical source means and said ground, whereby energization of one of said light sources in one of said transducers effects an illumination of the lamp in series with the transistor connected to said one transducer while the other two lamps remain unlit, and whereby the lamp in series with the third transducer is ignited by said positive source when said light source in said transducers are not energized.

12. An apparatus according to claim 3 wherein one of said impulse circuits includes a transistor and a lamp in series with the emitter-collector circuit of said transistor between said electrical source means and ground, the base of said transistor being connected by a plurality of impulse circuits through a logic "or" gate to elements of the machine, whereby the functioning of said elements causes the appearance of a potential in said "or" gate which energizes said transistor and lights said lamp.

13. An apparatus according to claim 3 wherein one of said impulse circuits is responsive to closure of said second switch and includes a voice coil in parallel with the lamp of said one impulse circuit and in series with a reversing circuit for effecting intermittent operation of said voice coil and its parallel lamp upon closure of said second switch.

14. In a photocomposition machine for performing predetermined functions in response to actuation of a sensing device by a precoded member, said machine having shutoff means for disabling same, a control device for monitoring the performance of said functions of said machine and indicating the state thereof, comprising:
a plurality of electrically operated indicators mounted in a group near said machine;
a source of electrical energy;
a plurality of electrical impulse circuits for connecting each of said indicators to a selected function of the machine so that said indictors are electrically energized in a predetermined pattern when their corresponding functions perform in a predetermined manner;
first switch means;
gate means connnected in series between a plurality of said electrical impulse circuits and said first switch means; and
second switch means connected in series between the shutoff means of said machine and said source of electrical energy, said second switch means being operated in response to operation of said gate means and said first switch means, whereby the shutoff means is operated.

15. In a photocomposition machine for performing predetermined functions in response to actuation of a sensing device by a precoded member, said machine having an electrically actuated shutoff means for disabling said machine, a circiut for actuating said shutoff means in response to an improper performance by one of said functions, comprising:
circuit means for converting each of said functions into an electrical impulse having a predetermined characteristic responsive to an improper performance of said function;
visible indicator means electrically connected to said circuit means for operation in a predetermined sequence responsive to the proper performance of said functions;
a source of electrical energy;
first switch means;
gate means connected in series between said circuit means and said first switch means, said first switch means being operated in response to the appearance at said gate of a said electrical impulse from a said function; and
second switch means connected in series between the electrically actuated shutoff means of said machine and a source of electrical energy, said second switch means being operated in response to said operation of said first switch means, whereby the machine is disabled.

16. A circuit according to claim 15 including third switch means in series with said second switch means, said third switch means being closed in response to a predetermined operation of the machine; and
including a stable multivibrator in series with said third switch means between a positive source and ground, said multivibrator being in parallel with a voice coil and a lamp whereby closure of said third switch effects an intermittent lighting of said lamp and energization of said voice coil.

17. In a photocomposition machine for performing predetermined functions in response to actuation of a sensing device by a precoded tape, a control device for monitoring the performance of said machine and indicating the state thereof, comprising:
a plurality of electrically operated indicators capable of producing visible signals and mounted in a group near said machine;
a plurality of electrical impulse circuits for connecting each of said indicators to a selected portion of the machine so that the operation of each indicator is responsive in a predetermined pattern to the functioning of its corresponding portion in a predetermined pattern;
a plurality of code sensing devices arranged on the machine for actuation by said tape;
a shutoff means for disabling said machine;
first switch means;
gate means connected in series between a plurality of said electrical impulse circuits and said first switch means, said first switch means being operated in response to operation of said gate means; and
second switch means connected in series between said shutoff means and a source of electrical energy, said second switch means being operated in response to operation of said gate means and said first switch means, whereby said shutoff means is operated.

18. A control device according to claim 14 wherein said first switch is a transistor having its emitter electrically connected to said second switch and having its collector and its base electrically and respectively connected to two groups of said electrical impulse circuits, each impulse circuit in said groups being separated from said transistor by a diode oriented to isolate the input circuit connected thereto from every other input circuit to produce an "or" gate in each group.

19. The control device of claim 18 wherein said second switch is a transistor having its base connected to the emitter of said first switch, its collector connected to the shutoff means and its emitter connected to the source of electrical energy.

20. In a photocomposition machine having mechanisms for exposing predetermined indicia on a sensitized film in response to actuation of a sensing mechanism by a precoded tape, said machine having an apparatus for monitoring and controlling the operation of said machine and indicating the state of such operation, the combination comprising:
a light tight cabinet in said machine;
a tape reading head on the machine, said head having a plurality of sensing devices arranged for actuation by the code on the tape;
film holding means in said machine;
film advance means for moving said film with respect to said holding means;
scanning carriage means disposed in and movable with respect to said machine;
indicia supporting means in said cabinet and indicia thereon;
light source means in said cabinet;
lens means for causing said light source to project said indicia upon said film in a selectable size;
panel means mounted upon said machine, said panel means being easily visible from a location externally of said machine;
a plurality of electrically operated indicators capable of producing visible signals and mounted in a group on said panel means;
a plurality of electrically operated, impulse circuits, each circuit connecting one of said indicators to a selected one of the mechanisms of said machine, said mechanisms including said sensing devices, said film advance means, said scannning carriage means and said lens means, and indicators being arranged to operate in a predetermined pattern when their corresponding elements function in a predetermined manner;
source means of electrical energy connectible with said impulse circuits and to a portion of said mechanisms of said machine;
switch means for disconnecting said portion of said mechanisms from said source means, whereby said machine is disabled.

References Cited by the Examiner
UNITED STATES PATENTS

| | | | |
|---|---|---|---|
| 2,333,835 | 11/1943 | Wangerin | 88—24 |
| 2,492,127 | 12/1949 | Hessert | 88—24 |
| 2,727,226 | 12/1955 | Giskes | 340—259 |
| 2,728,905 | 12/1955 | Eklund | 340—259 |
| 2,994,074 | 7/1961 | Durand | 340—259 |
| 3,047,843 | 7/1962 | Katz | 340—213 |
| 3,065,462 | 11/1962 | Maltby | 340—213 |
| 3,103,656 | 9/1963 | Laman | 340—259 |
| 3,106,880 | 10/1963 | Rossetto | 95—4.5 |

JOHN M. HORAN, *Primary Examiner.*